United States Patent [19]
Hirata et al.
[11] Patent Number: 4,938,022
[45] Date of Patent: Jul. 3, 1990

[54] FLOW CONTROL SYSTEM FOR HYDRAULIC MOTORS

[75] Inventors: Toichi Hirata, Ushiku; Yusaku Nozawa, Ibaragi, both of Japan

[73] Assignee: Hitachi Construction Machinery Co., Ltd., Tokyo, Japan

[21] Appl. No.: 213,107

[22] Filed: Jun. 29, 1988

[30] Foreign Application Priority Data

Oct. 5, 1987 [JP] Japan .............................. 62-249900

[51] Int. Cl.[5] .............................. F16H 39/44

[52] U.S. Cl. .............................. 60/426; 91/517; 91/518; 91/531; 137/596.14

[58] Field of Search .................. 91/448, 461, 517-518, 91/531-532; 60/426, 464; 137/596.14, 596.16; 251/35

[56] References Cited

U.S. PATENT DOCUMENTS

| | | | |
|---|---|---|---|
| 2,565,242 | 8/1951 | Lane | 91/417 R |
| 3,608,435 | 9/1971 | Conabee et al. | 91/461 X |
| 4,362,018 | 12/1982 | Torii | 60/468 |
| 4,383,412 | 5/1983 | Presley | 60/430 |
| 4,425,759 | 1/1984 | Krusche | 60/420 |
| 4,535,809 | 8/1985 | Andersson | 137/596.14 |
| 4,617,854 | 10/1986 | Kropp | 91/517 |
| 4,712,376 | 12/1987 | Hadank et al. | 60/427 |

FOREIGN PATENT DOCUMENTS

| | | | |
|---|---|---|---|
| 409734 | 4/1969 | Australia . | |
| 99134 | 1/1984 | European Pat. Off. | 91/461 |
| 0235545 | 9/1987 | European Pat. Off. . | |
| 0262098 | 3/1988 | European Pat. Off. . | |
| 2298754 | 8/1976 | France | 251/35 |
| 222601 | 11/1985 | Japan . | |
| 250131 | 12/1985 | Japan . | |
| 1078908 | 8/1967 | United Kingdom . | |

*Primary Examiner*—Robert E. Garrett
*Assistant Examiner*—George Kapsalas
*Attorney, Agent, or Firm*—Fay, Sharpe, Beall, Fagan, Minnich & McKee

[57] ABSTRACT

In a hydraulic drive system, first and second flow control valves means comprise each: a main valve having a valve body for controlling communication between an inlet port and an outlet port both connected to a main circuit, a variable restrictor capable of changing an opening degree thereof in response to displacements of the valve body, and a back pressure chamber communicating with the outlet port through the variable restrictor and producing a control pressure to urge the valve body in the valve-opening direction; a pilot valve connected to a pilot circuit which is connected between the inlet port of and the back pressure chamber of the main valve; and an auxiliary valve connected to the pilot circuit for controlling a differential pressure between the inlet pressure and the outlet pressure of the pilot valve. The auxiliary valve is controlled such that the differential pressure between the inlet and outlet pressures of the pilot valve has a relationship expressed by a certain equation including predetermined constants $\alpha$, $\beta$ and $\gamma$, with respect to a differential pressure between the delivery pressure of a hydraulic pump and the maximum load pressure of first and second hydraulic actuators, a differential pressure between that maximum load pressure and the self-load pressure of each of the hydraulic actuators, and the self-load pressure, respectively.

22 Claims, 15 Drawing Sheets

FLOW CONTROL SYSTEM FOR HYDRAULIC MOTORS

BACKGROUND OF THE INVENTION

The present invention relates to a hydraulic drive system for hydraulic construction machines, such as hydraulic excavators and hydraulic cranes, each equipped with a plurality of hydraulic actuators, and more particularly, to a hydraulic drive system for controlling a flow rate of hydraulic fluid supplied to the hydraulic actuators using flow control valves each having a pressure compensating function.

Heretofore, a hydraulic drive system for hydraulic construction machines, such as hydraulic excavators and hydraulic cranes, each equipped with a plurality of hydraulic actuators generally comprises at least one hydraulic pump, a plurality of hydraulic actuators connected to the hydraulic pump through respective main circuits and driven by hydraulic fluid delivered from the hydraulic pump, and a plurality of flow control valves connected to the respective main circuits between the hydraulic pump and the respective hydraulic actuators.

U.S. Pat. No. 4,617,854 discloses a hydraulic drive system of the type that an auxiliary valve disposed in the main circuit upstream of each flow control valve. The inlet and outlet pressures of the flow control valve are both introduced to the first one of opposite operating parts of the auxiliary valve. The delivery pressure of the hydraulic pump and the maximum load pressure among a plurality of hydraulic actuators are both introduced to a second one of the opposite operating parts thereof, and a pump regulator of load sensing type serving to hold the delivery pressure of the hydraulic pump at a predetermined value higher than that maximum load pressure. In this arrangement, by introducing the inlet and outlet pressures of the flow control valve to the first one of the opposite operating parts of the auxiliary valve, the load pressure of the flow control valve is compensated as known in the art. Also, by introducing the delivery pressure of the hydraulic pump regulated by the pump regulator and the maximum load pressure among the plurality of hydraulic actuators to the second one of the opposite operating parts of the auxiliary valve, it is made possible in the combined operation of the plurality of hydraulic actuators having respective load pressures different from each other that, even if the total of commanded flow rates (required flow rates) of the respective hydraulic actuators exceeds a maximum delivery flow rate of the hydraulic pump, the delivery rate of the hydraulic pump is distributed in accordance with relative ratios of the commanded flow rates to thereby ensure that hydraulic fluid is reliably passed to the hydraulic actuators on the side of higher load pressure as well.

On the other hand, U.S. Pat. No. 4,535,809 discloses a hydraulic drive system directed to use of not a plurality of, but a single hydraulic actuator. In this hydraulic drive system, each flow control valve connected to a main circuit between a hydraulic pump and a hydraulic actuator is constituted by a combination of a main valve of seat valve type and a pilot valve connected to a pilot circuit between an output port and a back pressure chamber of the main valve. An auxiliary valve is also disposed in the pilot circuit, and the input and output pressures of the pilot valve are introduced to opposite operating parts of the auxiliary valve, respectively, for providing a pressure compensating function. This patent further discloses a modification in which the self-load pressure is used to affect operation of the single hydraulic actuator for modification of the pressure compensating function.

In U.S. Pat. No. 4,617,854, however, the flow control valve and the auxiliary valve each comprise a spool valve which is relatively large in size, as they are both disposed in the main circuit. Since the auxiliary valve is disposed in the main circuit through which a large flow rate passes, there is suffering from the problem of increasing pressure loss at the auxiliary valve.

Generally speaking, each hydraulic actuator in the hydraulic drive system preferably should be supplied with a corresponding flow rate free of any effects from self-load pressure and respective load pressures of other hydraulic actuators. Meanwhile, in some cases, it may be preferable for some hydraulic actuators of a hydraulic drive system employed in construction machines such as hydraulic excavators to be affected by load pressures of any other hydraulic actuators or self-load pressures depending on the types of working members and the working modes thereof to be driven by the relevant hydraulic actuators.

For example, when a hydraulic excavator is used for loading earth onto a truck by carrying out swing and boom-up operations concurrently, the load pressure of a swing motor becomes high at the beginning of the swing operation and exceeds the limit pressure of a relief valve provided for circuit protection, because a swing body is an inertial body. To the contrary, the boom load pressure which represents a boom holding pressure is lower than the swing load pressure. In such a working mode, if hydraulic fluid is supplied to the boom to the extent possible rather than being relieved during the time the swing load pressure remains higher at the beginning of the swing operation, less energy will be wasted, and the boom-up and swing operations can automatically be adjusted in their speeds such that the boom-up speed is increased faster than the swing speed at the beginning and, after the boom has been raised up to some extent, the swing speed is gradually increased.

Similarly, in the sole swing operation or the combined swing operation with other hydraulic actuators, the swing load pressure exceeds the limit pressure of a relief valve at the beginning of the swing, as mentioned above. Thus, less energy will be wasted provided that the amount of hydraulic fluid supplied to the swing motor can be reduced with the increasing swing load pressure.

In some working modes of a hydraulic excavator, such as normal surface make-up working effected by the combined operation of boom and arm thereof, it is desired to accurately distribute the flow rate in response to the ratio of operated amounts of a boom control lever to an arm control lever irrespective of the magnitude of load pressures.

In construction machines such as hydraulic excavators, therefore, it is preferred that the flow control valve has its characteristics which are not determined uniquely for specific pressure compensating and/or flow distributing function, but can be modified to flexibly provide various functions depending on the types of working members and the working modes thereof driven by respective hydraulic actuators.

In U.S. Pat. No. 4,617,854, however, while a pressure compensating function and a flow distributing function can be obtained by providing the auxiliary valve as mentioned above, there is disclosed no idea of introducing effects from load pressures of other hydraulic actuators or self-load pressure in order to modify those functions. Thus, this patent could not meet the above demand of modifying characteristics of the flow control valve depending on the types of and forms of the working members.

Since U.S. Pat. No. 4,535,809 discloses a hydraulic drive system directed to use of a single hydraulic actuator, provision of the auxiliary valve merely enables performance of a pressure compensating function in connection with operation of the single hydraulic actuator, or modify the pressure compensating function by introducing an effect of the self-load pressure of the single hydraulic actuator. Thus, this patent has no relation with the technique of modifying various functions in the combined operation of a plurality of hydraulic actuators. In particular, there is disclosed no idea of introducing effects of load pressures of other hydraulic actuators to modify the pressure compensating function and the flow distributing function.

It is an object of the present invention to provide a hydraulic drive system which is less subject to pressure loss, and which can modify characteristics of a flow control valve depending on the types of working members for use in hydraulic construction machines and the working modes thereof.

SUMMARY OF THE INVENTION

To achieve the above object, the present invention provides a hydraulic drive system comprising; at least one hydraulic pump; at least first and second hydraulic actuators connected to the hydraulic pump through respective main circuits and driven by hydraulic fluid delivered from the hydraulic pump; first and second flow control valve means connected to the respective main circuits between the hydraulic pump and the first and second hydraulic actuators; pump control means for controlling a delivery pressure of the hydraulic pump; each of the first and second flow control valve means comprising first valve means having an opening degree variable in response to the operated amount of operation means, and second valve means connected in series with the first valve means for controlling a differential pressure between the inlet pressure and the output pressure of the first valve means; and control means associated with each of the first and second flow control valve means for controlling the second valve means based on the input pressure and the output pressure of the first valve means, the delivery pressure of the hydraulic pump, and the maximum load pressure between the first and second hydraulic actuators. Each of the first and second flow control valve means comprises; a main valve having a valve body for controlling communication between an inlet port and an outlet port both connected to the main circuit, a variable restrictor capable of changing an opening degree thereof in response to displacements of the valve body, and a back pressure chamber communicating with the outlet port through the variable restrictor and producing a control pressure to urge the valve body in the valve-opening direction; and a pilot circuit connected between the inlet port and the back pressure chamber of the main valve. The first valve means is constituted by a pilot valve connected to the pilot circuit for controlling a pilot flow passing through the pilot circuit. The second valve means is constituted by an auxiliary valve connected to the pilot circuit for controlling a differential pressure between the inlet pressure and the outlet pressure of the pilot valve. The control means controls the auxiliary valve for each of the first and second flow control valve means such that the differential pressure between the inlet pressure and the outlet pressure of the pilot valve have a relationship as expressed by the following equation with respect to a differential pressure between the delivery pressure of the hydraulic pump and the maximum load pressure of the first and second hyrdraulic actuators, a differential pressure between the maximum load pressure and the self-load pressure of each of the hydraulic actuators, and the self-load pressure, $$\Delta Pz = \alpha(Ps - Pl\ \max) + \beta(Pl\ \max - Pl) + \gamma Pl$$

where $\Delta$Pz: differential pressure between the inlet pressure and the outlet pressure of the pilot valve Ps: delivery pressure of the hydraulic pump Pl max: maximum load pressure between the first and second hydraulic actuators Pl: self-load pressure of each of the first and second hydraulic actuators $\alpha$, $\beta$, $\gamma$: first, second and third constants the first, second and third constants $\alpha$, $\beta$, $\gamma$ being set to respective predetermined values.

As a result of studying relationships between the auxiliary valve disposed in the pilot circuit and the differential pressure across the pilot valve from various viewpoints, the present inventors have found that the differential pressure $\Delta$Pz across the pilot valve controlled by the auxiliary valve means is generally expressed by the foregoing equation.

The equation has the meaning as follows. In that equation, the first term Ps−Pl max in the right side is common to all of the flow control valves and hence governs a flow distributing function in the combined operation. The second term Pl max−Pl is changed depending on the maximum load pressure among other actuators and hence governs a harmonizing function in the combined operation. The third term $\gamma$Pl is changed depending on the self-load pressure and hence governs a self-pressure compensating function. Actuation or nonactuation and the degree of these three functions are determined depending on respective values of the constants $\alpha$, $\beta$, $\gamma$. More specifically, the flow distributing function represented by the first term is an essential function to the combined operation. Therefore, the constant $\alpha$ is set to a predetermined positive value irrespective of the types of associated working members. On the contrary, the harmonizing function and the self-pressure compensating function respectively represented by the second and third terms are additional functions effected depending on the types of associated working members and the working modes thereof. Therefore, the constants $\beta$, $\gamma$ are each set to a predetermined value including zero. By so setting $\alpha$, $\beta$, $\gamma$, it becomes possible to provide the flow distributing function, or the harmonizing function and/or the self-pressure compensating function based on the flow distributing function, thereby enabling to modify characteristics of the flow control valves depending on the types of working members for use in hydraulic construction machines and the working modes thereof.

In the above arrangement of the present invention, the auxiliary valves are installed in not the main circuits but the pilot circuits, and the main valves installed in the main circuits are constituted in the form of seat valves. This makes it possible to provide the hydraulic circuit which is less susceptible to fluid leakage and suitable for higher pressurization. With the auxiliary valves disposed in the pilot circuits, appreciable pressure loss will not occur at the auxiliary valves even if a large flow rate is passed through the main circuits.

In the present invention, the first constant $\alpha$ preferably meets a relationship of $\alpha \leqq K$, assuming that K is a ratio of the pressure receiving area of the valve body of the main valve, which undergoes the load pressure of the associated pump through the outlet port, to the pressure receiving area of the valve body of the main valve, which undergoes the control pressure of the back pressure chamber. This limits the differential pressure determined by $\alpha$ (PS−Pl max) within the maximum differential pressure available across the pilot valve on the side of higher load pressure. Thus, the first and second flow control valves have their respective differential pressures given by the first term in the right side of the above equation substantially equal to each other, so that the flow rate can accurately be distributed in proportion to the operated amounts of the operation means (i.e., opening degrees of the pilot valves) in the fluid distributing function.

The first constant $\alpha$ has the meaning of a proportional gain of the pilot flow rate with respect to the operated amount of the operation means (i.e., opening degree of the pilot valve), namely a proportional gain of the flow rate passing through the main valve with respect to that operated amount. Thus, the first constant $\alpha$ is set to any desired positive value corresponding to the proportional gain. Where $\alpha = K$ is set, the maximum proportional gain can be provided while attaining the fluid distributing function to distribute the flow rate in proportion to the operated amounts of the operation means.

As will be apparent from the following foregoing description, the second constant $\beta$ is set to any desired value taking into account harmonization in the combined operation of the associated hydraulic actuator and one or more other hydraulic actuators. In particular, where it is preferable not to accept any effects from load pressures of other hydraulic actuators, $\beta$ is set equal to zero.

Also as will be apparent from the following description, the third constant $\gamma$ is set to any desired value taking into account operating characteristics of the associated hydraulic actuator. In particular, where it is preferable not to accept any effect of the self-load pressure, $\gamma$ is also set equal to zero.

The control means may have a plurality of hydraulic control chambers provided in each of the auxiliary valves for the first and second flow control valve means, and line means for directly or indirectly introducing the delivery pressure of the hydraulic pump, the maximum load pressure, and the inlet pressure and the outlet pressure of the pilot valve to the plurality of hydraulic control chambers. In this case, the respective pressure receiving areas of the plurality of hydraulic control chambers are set such that the first, second and third constants $\alpha$, $\beta$, $\gamma$ take their predetermined values.

As an example to constitute the control means in a hydraulic manner, the auxiliary valve is disposed between the inlet port of the main valve and the pilot valve, the plurality of hydraulic control chambers comprise first and second hydraulic control chambers for urging the auxiliary valve in the valve-opening direction, and third and fourth hydraulic control chambers for urging the auxiliary valve in the valve-closing direction, and the line means comprises a first line for introducing the delivery pressure of the hydraulic pump to the first hydraulic chamber, a second line for introducing the outlet pressure of the pilot valve to the second hydraulic control chamber, a third line for introducing the maximum load pressure to the third hydraulic control chamber, and a fourth line for introducing the inlet pressure of the pilot valve to the fourth hydraulic control chamber.

The auxiliary valve may be disposed between the back pressure chamber of the main valve and the pilot valve, the plurality of hydraulic control chambers may comprise a first hydraulic control chamber for urging the auxiliary valve in the valve-opening direction, and second, third and fourth hydraulic control chambers for urging the auxiliary valve in the valve-closing direction, and the line means may comprise a first line for introducing the outlet pressure of the pilot valve to the first hydraulic chamber, a second line for introducing the inlet pressure of the pilot valve to the second hydraulic control chamber, a third line for introducing the load pressure of the associated hydraulic actuator to the third hydraulic control chamber, and a fourth line for introducing the maximum load pressure to the fourth hydraulic control chamber.

Also, the auxiliary valve may be disposed between the back pressure chamber of the main valve and the pilot valve, the plurality of hydraulic control chambers may comprise first and second hydraulic control chambers for urging the auxiliary valve in the valve-opening direction, and third and fourth hydraulic control chambers for urging the auxiliary valve in the valve-closing direction, and the line means may comprise a first line for introducing the load pressure of the associated hydraulic actuator to the first hydraulic chamber, a second line for introducing the outlet pressure of the pilot valve to the second hydraulic control chamber, a third line for introducing the maximum load pressure to the third hydraulic control chamber, and a fourth line for introducing the control pressure of the back pressure chamber to the fourth hydraulic control chamber.

Further, the auxiliary valve may be disposed between the inlet port of the main valve and the pilot valve, the plurality of hydraulic control chambers may comprise first and second hydraulic control chambers for urging the auxiliary valve in the valve-opening direction, and third and fourth hydraulic control chambers for urging the auxiliary valve in the valve-closing direction, and the line means may comprise a first line for introducing the load pressure of the associated hydraulic actuator to the first hydraulic chamber, a second line for introducing the delivery pressure of the hydraulic pump to the second hydraulic control chamber, a third line for introducing the maximum load pressure to the third hydraulic control chamber, and a fourth line for introducing the inlet pressure of the pilot valve to the fourth hydraulic control chamber.

Moreover, the auxiliary valve may be disposed between the back pressure chamber of the main valve and the pilot valve, the plurality of hydraulic control chambers may comprise a first hydraulic control chamber for urging the auxiliary valve in the valve-opening direction, and second and third hydraulic control chambers for urging the auxiliary valve in the valve-closing direction, and the line means may comprise a first line for introducing the outlet pressure of the pilot valve to the first hydraulic chamber, a second line for introducing the delivery pressure of the hydraulic pump to the second hydraulic control chamber, and a third line for introducing the maximum load pressure to the third hydraulic control chamber.

The pump control means can be a pump regulator of load sensing type for holding the delivery pressure of the hydraulic pump higher a predetermined value than the maximum load pressure between the first and second hydraulic actuators. With this feature, inasmuch as the pump regulator is effectively operating, the differential pressure Ps−Pl max, represented by the first term in the right side of the above equation, between the delivery pressure and the maximum load pressure of the first and second hydraulic actuators is held at a constant level. Therefore, the differential pressure between the inlet pressure and the outlet pressure of the pilot valve can be controlled to remain constant, thereby effecting the pressure compensating function with which the flow rate is maintained at constant irrespective of changes in the differential pressure between the inlet and outlet ports of the main valve.

To achieve the above-mentioned object, the present invention also provides a hydraulic excavator comprising; at least one hydraulic pump; a plurality of hydraulic actuators connected to the hydraulic pump through respective main circuits and driven by hydraulic fluid delivered from the hydraulic pump; a plurality of working members including a swing body, boom, arm and bucket, and driven by the plurality of hydraulic actuators, respectively; a plurality of flow control valve means connected to the respective main circuits between the hydraulic pump and the plurality of hydraulic actuators; pump control means for controlling a delivery pressure of the hydraulic pump; each of the plurality of flow control valve means comprising first valve means having an opening degree variable in response to the operated amount of operation means, and second valve means connected in series with the first valve means for controlling a differential pressure between the inlet pressure and the output pressure of the first valve means; and control means associated with each of the plurality of flow control valve means for controlling the second valve means based on the input pressure and the output pressure of the first valve means, the delivery pressure of the hydraulic pump, and the maximum load pressure among the plurality of hydraulic actuators. Each of the plurality of flow control valve means comprises; a main valve having a valve body for controlling communication between an inlet port and an outlet port both connected to the main circuit, a variable restrictor capable of changing an opening degree thereof in response to displacements of the valve body, and a back pressure chamber communicating with the outlet port through the valuable restrictor and producing a control pressure to urge the valve body in the valve-opening direction; and a pilot circuit connected between inlet port and the back pressure chamber of the main valve; wherein the first valve means is constituted by a pilot valve connected to the pilot circuit for controlling a pilot flow passing through the pilot circuit, and the second valve means is constituted by an auxiliary valve connected to the pilot circuit for controlling a differential pressure between the inlet pressure and the outlet pressure of the pilot valve. The control means controls the auxiliary valve for each of the plurality of flow control valve means associated with at least two working members among the swing body, boom, arm and bucket, such that the differential pressure between the inlet pressure and the outlet pressure of the pilot valve has a relationship as expressed by the following equation with respect to a differential pressure between the delivery pressure of the hydraulic pump and the maximum load pressure among the plurality of hydraulic actuators, a differential pressure between the maximum load pressure and the self-load pressure of each of the hydraulic actuators, and the self-load pressure, $$\Delta Pz = \alpha(Ps - Pl\ \max) + \beta(Pl\ \max - Pl) + \gamma Pl$$

where

ΔPz: differential pressure between the inlet pressure and the outlet pressure of the pilot valve Ps: delivery pressure of the hydraulic pump Pl max: maximum load pressure among the plurality of hydraulic actuators Pl: self-load pressure of each of the plurality of hydraulic actuators $\alpha$, $\beta$, $\gamma$: first, second and third constants the first, second and third constants $\alpha$, $\beta$, $\gamma$ being set to respective predetermined values.

According to the present invention thus arranged, characteristics of the flow control valves associated with at least two working members among the swing body, boom, arm and bucket can be set and modified depending on the types of working members and the working modes thereof. Thus, it becomes possible to attain the flow distributing function, or the harmonizing function and/or the self-pressure compensating function based on the flow distributing function, as mentioned above.

Preferably, the control means sets the second constant $\beta$ to a relatively large positive value for the flow control valve means associated with the bottom side of the hydraulic actuator for the boom.

By so setting, at the initial accelerating stage in the combined swing and boom-up operation, the flow rate corresponding to an increase in the differential pressure between the maximum load pressure (swing pressure) and the self-load pressure (boom pressure) is passed through the bottom side flow control valve of the boom's hydraulic actuator on the lower load side, thereby enabling to increase the boom-up speed. Thus, even when both the swing and boom-up control levers are operated to their full strokes concurrently, there can automatically be obtained the combined operation that the boom-up speed is increased faster than the swing speed at the beginning and, after the boom has been raised up to some extent, the swing speed is increased gradually. Then, reaching the maximum speed, the swing speed remains substantially constant.

Preferably, the control means sets the second constant $\beta$ to a relatively small positive value for the flow control valve means associated with the bottom side of the hydraulic actuator for the arm. By so setting, when the combined operation using the arm is carried out for excavation, the arm is driven reliably. In addition, when the the hydraulic actuator for the arm is on the lower pressure side, the opening degree of the associated flow control valve is enlarged in response to an increase in the differential pressure between the maximum load pressure (any one pressure of other hydraulic actuators) and the self-load pressure (arm pressure), thereby reducing the degree of restricting the flow rate. As a result, it is possible to prevent deterioration of fuel economy and heat balance.

Preferably, the control means sets the second constant $\beta$ to a relatively small negative value for the flow control valve means associated with the bottom side of the hydraulic actuator for the bucket. By so setting, when the combined operation using the bucket is carried out for digging grooves, the flow rate passing through the associated flow control valve is reduced upon an increase in the differential pressure between the maximum load pressure (any one pressure of other hydraulic actuators) and the self-load pressure (bucket pressure), at the moment the bucket is released from the digging load and comes up to the ground surface, thereby enabling shock mitigation.

Preferably, the control means sets the third constant $\gamma$ to a relatively small negative value for the flow control valve means associated with the hydraulic actuator for the swing body. By so setting, during the swing acceleration, the flow rate passing through the flow control valve associated with the swing can be reduced in response to an increase in the swing pressure (self-load pressure). Thus, the flow rate discharged through the relief valve is also reduced to save energy consumption.

Preferably, the control means sets the third constant $\gamma$ to a relatively small positive value for the flow control valve means associated with the hydraulic actuator for the bucket. By so setting, when the bucket is used for excavation, the flow rate passing through the associated flow control valve can be increased in response to an increase in the bucket pressure (self-load pressure), thereby providing powerful feeling during the excavation.

Preferably, the control means sets the second and third constants $\beta$, $\gamma$ to zero for the flow control valve means associated with the rod side of the hydraulic actuator for each of the boom and the arm. By so setting, when the boom and the arm are used for making up the normal surface of a ramp, any effects from the load pressures of other hydraulic actuators and the self-load pressure are eliminated completely, so that the flow rate can accurately be distributed in proportion to the operated amounts of the boom and arm control levers for making-up of the desired accurate normal surface.

DETAILED DESCRIPTION OF THE PREFERRED EMBODIMENTS

Preferred embodiments of the present invention will be described below with reference to the drawings.

Basic Embodiment

Figure 1:
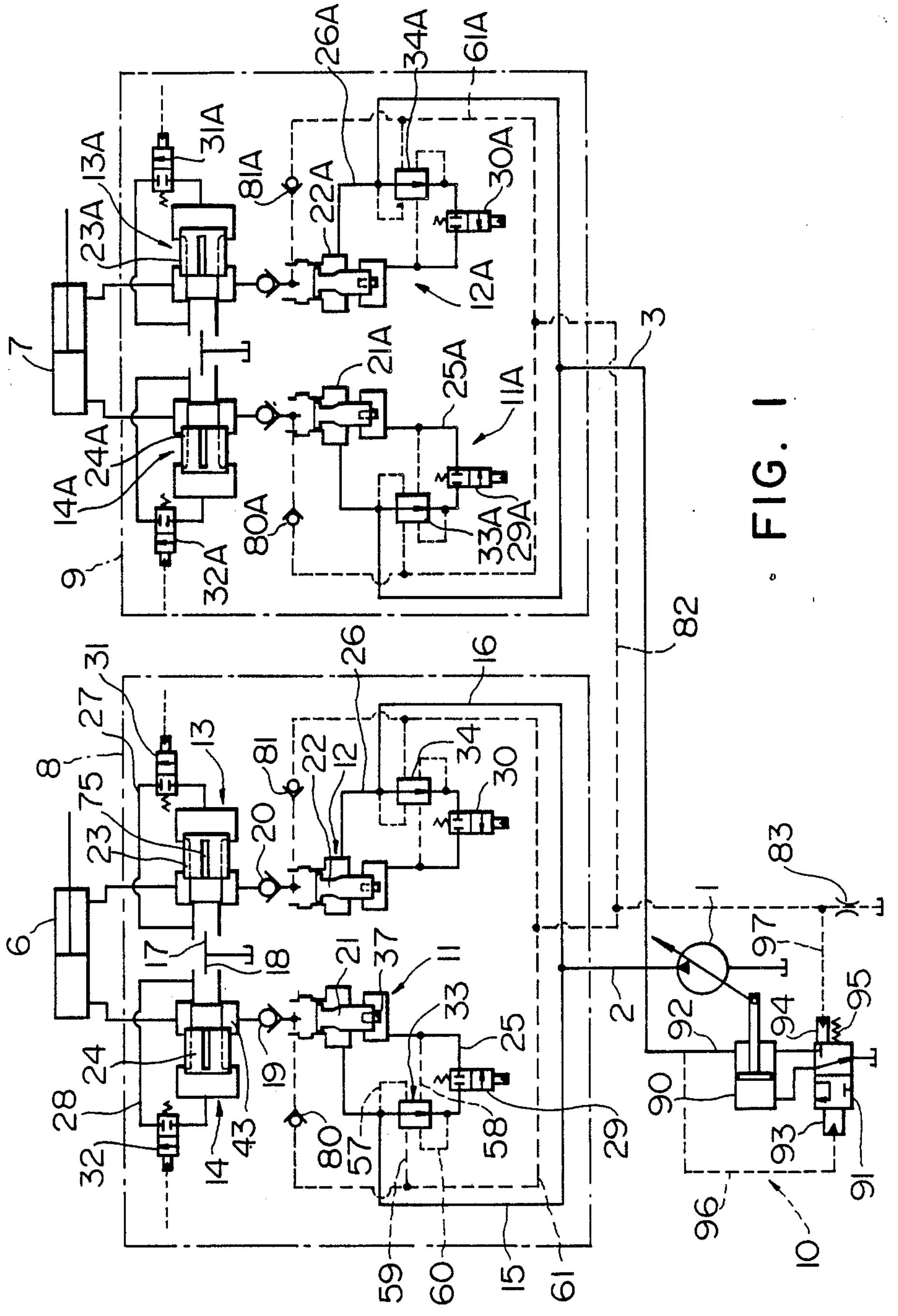
FIG. 1 is a schematic view showing an overall arrangement of a hydraulic drive system according to one embodiment of the present invention.

Referring to FIG. 1, a hydraulic drive system according to one embodiment of the present invention comprises a variable delivery hydraulic pump 1 of swash plate type, for example, a plurality of (e.g., two) hydraulic actuators 6, 7 connected to the hydraulic pump 1 through main circuits 2, 3, respectively, and driven by hydraulic fluid delivered from the hydraulic pump 1, and directional control valves 8, 9 connected to the main circuits 2, 3 between the hydraulic pump 1 and the hydraulic actuators 6, 7, respectively. The hydraulic pump 1 is associated with a pump regulator 10 of load sensing type which serves to hold a delivery pressure of the hydraulic pump 1 at a predetermined value higher than a maximum load pressure among the plurality of hydraulic actuators 6, 7.

The directional control valve 8 comprises four flow control valves 11, 12, 13, 14. The first flow control value 11 is connected to a metered flow-in (inlet side) circuit 15 which introduces hydraulic fluid therethrough when the hydraulic cylinder 6 is actuated to be extended. The second flow control valve 12 is connected to a metered flow-in circuit 16 which introduces hydraulic fluid therethrough when the hydraulic cylinder 6 is actuated to be contracted. The third flow control valve 13 is connected to a metered flow-out (outlet side) circuit 17 between the hydraulic cylinder 6 and the second flow control valve 12, which discharges hydraulic fluid therethrough when the hydraulic cylinder 6 is actuated to be extended. The fourth flow control valve 14 is connected to a metered flow-out circuit 18 between the hydraulic cylinder 6 and the first flow control valve 11, which discharges hydraulic fluid therethrough when the hydraulic cylinder 6 is actuated to be contracted. A check valve 19 for preventing hydraulic fluid from reversely flowing toward the first flow control valve 11 from the hydraulic actuator 6 is connected between the first flow control valve 11 and the fourth flow control valve 14, while another check valve 20 for preventing hydraulic fluid from reversely flowing toward the second flow control valve 12 from the hydraulic actuator 6 is connected between the second flow control valve 12 and the third flow control valve 13.

The first through fourth flow control valves 11–14 comprise main valves 21, 22, 23, 24, pilot circuits 25, 26, 27, 28 for controlling the corresponding main valves, and pilot valves 29, 30, 31, 32 connected to the corresponding pilot circuits, respectively. The first and second flow control valves 11, 12 further include respective pressure compensating valves 33, 34 connected to the pilot circuits 25, 26 in series with the pilot valves 29, 30.

Figure 2:
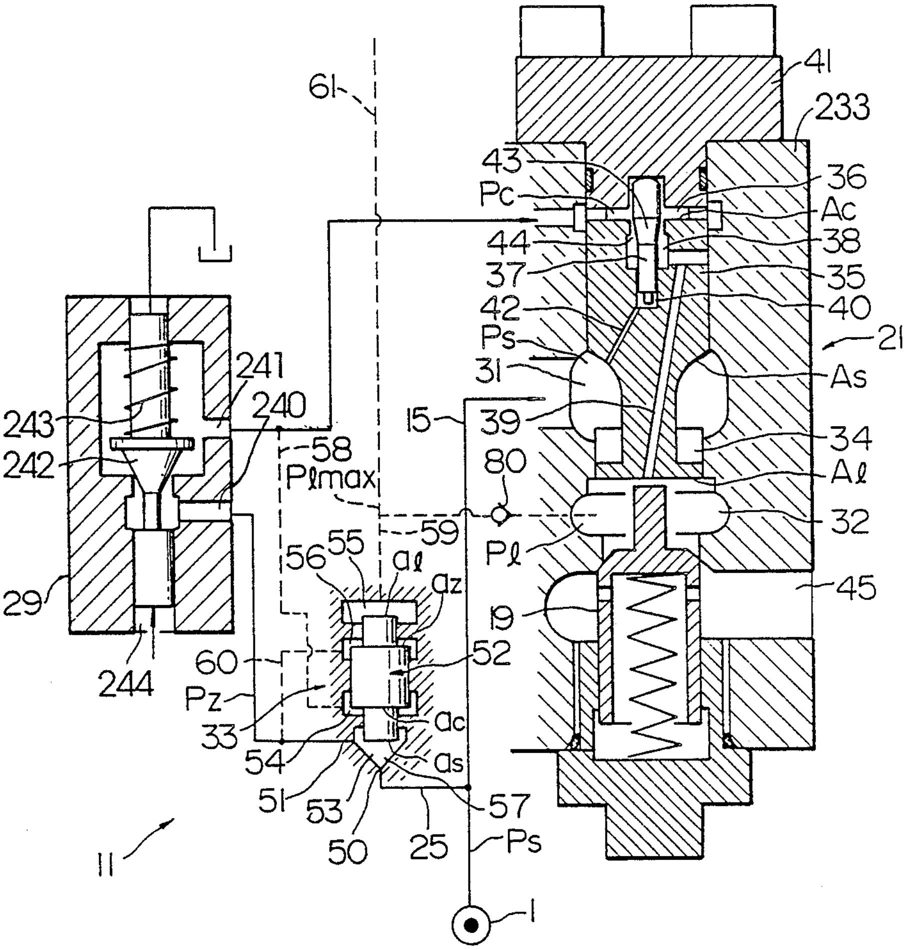
FIG. 2 is a sectional view showing the structure of a flow control valve connected to a metered flow-in circuit in the hydraulic drive system.

As shown in FIG. 2, the main valve 21 of the first flow control valve 11 comprises a valve housing 33, which has an inlet port 31 connected to a line of the metered flow-in circuit 15 communicating with the hydraulic pump 1 and an output port 32 connected to a line communicating the hydraulic actuator 6, and a valve body 35 disposed in the valve housing 233 and having a control orifice 34. The opening degree of the the control orifice 34 is regulated in response to displacement of the valve body 35 for thereby controlling communication between the inlet port 31 and the outlet port 32. The valve body 35 has defined on the side opposite to the control orifice 34 a back pressure chamber 36 which produces a control pressure Pc for urging the valve body 35 in the valve-opening direction. At the end of the valve body 35 facing the back pressure chamber 36, there is defined a chamber 38 communicating with the back pressure chamber 36 and accommodating a control piston 37 therein, the chamber 38 being also communicated with the outlet port 32 through a passage 39. The control piston 37 has one end accommodated in a pressure chamber 40 defined in the valve body 35, and the other end held by a plug member 41 in close contact relation which serves to close the back pressure chamber 36. The pressure chamber 40 is communicated with the inlet port 31 through a passage 42 and holds the control piston 37 in a close contact position with the plug member 41. The control piston 37 also has in its intermediate region a tapered portion 43 which cooperates with the inner wall of the chamber 38 at its opening to jointly make up a variable restrictor 44 capable of changing its opening degree in response to displacements of the valve body 35.

As per the valve body 35, the upper annular end surface (as viewed on the drawing sheet) thereof facing the inlet port 31 defines an annular pressure receiving area As which receives a delivery pressure Ps of the hydraulic pump 1 for urging the valve body 35 upward, i.e., in the valve-closing direction, the bottom wall surface thereof facing the output port 32 defines a pressure area Al which receives a load pressure Pl of the hydraulic actuator 6 for urging the valve body 35 in the valve-closing direction as well, and the top end surface thereof facing the back pressure chamber 36 defines a pressure receiving area Ac which receives the control pressure Pc for urging the valve body 35 downward, i.e, in the valve-opening direction. Among these pressure receiving areas, there exists the relationship of $Ac = As + Al$.

The check valve 19 is disposed below the valve body 35, and the valve housing 233 has an output port 45 for the check valve 19.

The pilot circuit 25 is connected between the inlet port 31 and the back pressure chamber 36 of the main valve 21.

The pilot valve 29 comprises a valve body 242 of poppet type for controlling communication between an inlet port 240 and an outlet port 241, a spring 243 for urging the valve body 242 in the valve-closing direction, and a hydraulic control chamber 244 for urging the valve body 242 in the valve-opening direction. The hydraulic control chamber 244 is connected to the pilot circuit which produces therein a pilot pressure corresponding to the operated amount of a control lever (not shown), so that the valve body 242 is opened to an opening degree corresponding to that operated amount.

The pressure compensating valve 33 comprises a valve body 52 of seat type for controlling communication between an inlet port 50 and an outlet port 51, first and second hydraulic control chambers 53, 54 for urging the valve body 52 in the valve-opening direction, and third and fourth hydraulic chambers 55, 56 positioned in opposite relation to the first and second hydraulic control chambers 53, 54 for urging the valve body 242 in the valve-closing direction. The first hydraulic control chamber 53 is formed by an inlet portion 57 of the pressure compensating valve 33 communicating with the inlet port 50, the second hydraulic control chamber 54 is connected to the pilot line 25 on the outlet side of the pilot valve 29 through a pilot line 58, the third hydraulic control chamber 55 is connected to a maximum load pressure line 61 (described later on) through a pilot line 59, and the fourth hydraulic control chamber 56 is connected to the pilot line on the inlet side of the pilot valve 29 through a pilot line 60. With the above arrangement, the delivery pressure Ps of the hydraulic pump 1 is introduced to the first hydraulic control chamber 53, the outlet pressure is of the pilot valve 29, which is equal to the control pressure Pc of the back pressure chamber 36, is introduced to the second hydraulic chamber 54, the load pressure of either hydraulic actuator 6 or 7 on the higher pressure side, i.e., the maximum load pressure Pl max, is introduced to the third hydraulic control chamber 55, and the inlet pressure Pz of the pilot valve 29 is introduced to the fourth hydraulic control chamber 56, respectively. Then, the end surface of the valve body 52 facing the first hydraulic control chamber 53 defines a pressure receiving area as which receives the delivery pressure Ps of the hydraulic pump 1. The annular end surface thereof facing the second hydraulic control chamber 54 defines a pressure receiving area ac which receives the outlet pressure Pc of the pilot valve 29. The end surface thereof facing the third hydraulic control chamber 55 defines a pressure receiving area am which receives the maximum load pressure Pl max between the hydraulic actuators 6, 7, and the annular end surface thereof facing the fourth hydraulic control chamber 56 defines a pressure receiving area az which receives the inlet pressure Pz of the pilot valve 15, respectively.

In the above arrangement, the first through fourth hydraulic control chambers 53–56 of the pressure compensating valve 33, the pilot lines 57–60, and those portions of the valve body 35 of the main valve 21 which defines the pressure receiving areas Ac, As jointly constitute control means for controlling the pressure compensating valve 33 such that the differential pressure $\Delta Pz(=Pz-Pl)$ between the inlet pressure and the outlet pressure of the pilot valve 29 has a relationship as expressed by the following equation with respect to a differential pressure Ps−Pl max between the delivery pressure of the hydraulic pump 1 and the maximum load pressure of the two hydraulic actuators 6, 7, a differential pressure Pl max−Pl between the maximum load pressure and the self-load pressure of each hydraulic actuator, and the self-load pressure Pl;

$$\Delta Pz=\alpha(Ps-Pl\ \max)+\beta(Pl\ \max-Pl)+\gamma Pl \quad (1)$$

where $\alpha$, $\beta$, $\gamma$ are first, second and third constants and set to respective predetermined values. In this embodiment, setting of the first, second and third constants $\alpha$, $\beta$, $\gamma$ to their respective predetermined values is made by properly selecting the pressure receiving areas as, ac, am, az of the first through fourth hydraulic control chambers 53–56 of the pressure compensating valve 33. In other words, the pressure receiving areas as, ac, am, az of the first through fourth hydraulic control chambers 53–56 are so set as to obtain the respective predetermined values of the first, second and third constants $\alpha$, $\beta$, $\gamma$. Further, the pressure receiving areas as, ac, am, az of the first through fourth hydraulic control chambers 53–56 are set such that the valve body 52 is held at its open position so long as the main valve 21 and the pilot valve 29 remain closed.

In the combination of the main valve 21 and the pilot valve 29 of the first flow control valve 11 thus arranged, at the moment the pilot valve 29 is opened upon operation of a control lever (not shown), hydraulic fluid is introduced from the hydraulic pump 1 to the back pressure chamber 36 of the main valve 21 through the pilot circuit 25. This increases the inner pressure or control pressure of the back pressure chamber 36 corresponding to the opening degree of the pilot valve 29. Hence, the pressure at the outlet port 32 communicating with the back pressure chamber 36 through the chamber 36 and the passage 39 is also increased correspondingly, so that the check valve 19 is opened. This produces a pilot flow passing from the pilot circuit 25 to the outlet port 32 through the back pressure chamber 36, whereupon the control pressure of back pressure chamber 36 is increased under the action of the variable restrictor 44 in response to the pilot flow rate (i.e., opening degree of pilot valve 29). When the opening degree of the pilot valve 29 exceeds that of the variable restrictor 44, the control pressure Pc is also increased correspondingly and the valve body 35 starts to move toward the outlet port 32. Thus, the main valve 21 is opened. When the valve 35 is moved in the valve-opening direction in this manner, the opening degree of the variable restrictor 44, which is determined by an open space around the control piston 37 held by and in pressure contact with the plug member 41, is enlarged to reduce the restriction action of the variable restrictor 44. As a result, the valve body 35 rests at the time the opening degree of the pilot valve 29 coincides with that of the variable restrictor 44.

In other words, the valve body 35 of the main valve 21 is opened to an opening degree proportional to the pilot flow rate under the action of both the variable restrictor 44 and the back pressure chamber 36, so that the flow rate corresponding to the operated amount of the control valve (i.e., opening degree of the pilot valve) is passed from the inlet port 31 to the outlet port 32 through the control orifice 34 of the main valve 21.

In connection with such control of the main valve 21 through the pilot valve 29, since the pressure compensating valve 33 is also installed in the pilot circuit 25, the flow rate passing through the main valve 21 is further controlled by the presence of the pressure compensating valve 33. The control function of the pressure compensating valve 33 is an essence of this embodiment, and hence will be described in detail in the following section of Operating Principle.

The main valve 22, pilot circuit 26, pilot valve 30 and pressure compensating valve 33 of the second flow control valve 12 are constructed similarly to the above-mentioned main valve 21, pilot circuit 25, pilot valve 29 and pressure compensating valve 33 of the first flow control valve 11, respectively.

Figure 3:
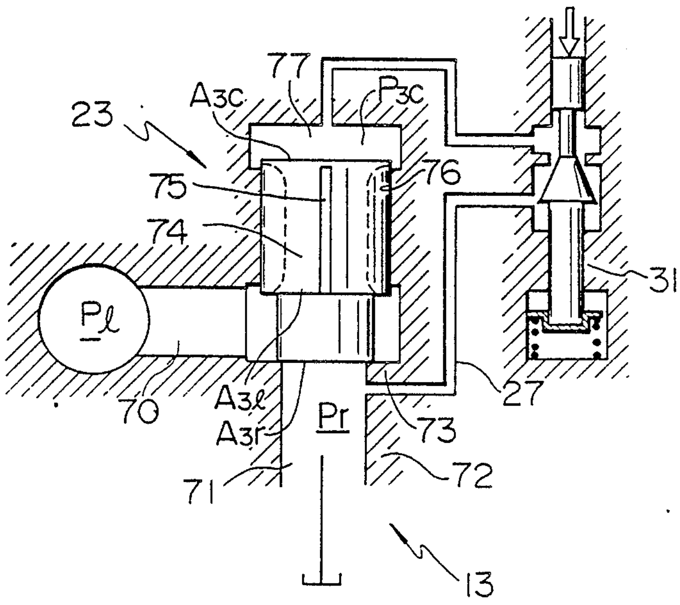
FIG. 3 is a sectional view showing the structure of a flow control valve connected to a metered flow-out circuit in the hydraulic drive system.

As shown in FIG. 3, the main valve 23 of the third flow control valve 13 comprises a valve housing 72, which has an inlet port 70 connected to a line of the metered flow-out circuit 17 on the side communicating with the hydraulic actuator 6 and an outlet port 71 connected to a line thereof communicating with the tank, and a valve body 74 engageable against a valve seat 73. Communication between the inlet port 70 and the outlet port 71 is controlled in response to displacements (i.e., opening degrees) of the valve body 74. The valve body 74 has formed in its outer circumference a plurality of axial slits 75 which cooperate with the inner wall of the valve housing 72 to make up a variable restrictor 76 capable of changing its opening degree in response to displacements of the valve body 74. At the back of the valve body 74 within the variable restrictor 76, there is defined a back pressure chamber 77 communicating with the inlet port 70 through the variable restrictor 76 and producing a control pressure P3c.

The upper annular end surface (as viewed on the drawing sheet) of the valve body 74 facing the inlet port 70 defines an annular pressure receiving area A3*l* which receives a load pressure of Pl of the hydraulic actuator 6 for urging the valve body 74 upward in the figure, i.e., in the valve-opening direction, the bottom wall surface thereof facing the outlet port 71 defines a pressure receiving area A3*r* which receives a tank pressure Pr for urging the valve body 74 also in the valve-opening direction, and the top end surface thereof facing the back pressure chamber 77 defines a pressure receiving area A3*c* which receives a control pressure P3*c* for urging the valve body 74 downward in the figure, i.e., in the valve-closing direction. These pressure receiving area meet the relationship of $A3c=A3l+A3r$.

The pilot circuit 27 is connected between the back pressure chamber 77 and the outlet port 71 of the main valve 23.

The pilot valve 31 is constructed similarly to the pilot valve 29 of the first flow control valve 11.

A combination of a main valve and a pilot valve as a flow control valve arranged as shown in FIG. 3 is known from U.S. Pat. No. 4,535,809. More specifically with reference to FIG. 3, when the pilot valve 31 is opened upon operation of a control lever (not shown), a pilot flow is produced in the pilot circuit 27 in response to the opening degree of the pilot valve 31.

Then, under the action of both the variable restrictor 76 and the back pressure chamber 77, the valve body 74 of the main valve is opened to an opening degree proportional to the pilot flow rate, so that the flow rate corresponding to the operated amount of the control lever (i.e., opening degree of the pilot valve 31) is passed from the inlet port 70 to the outlet port 71 through the main valve 23.

The main valve 24, pilot circuit 28 and pilot valve 32 of the fourth flow control valve 14 are constructed similarly to the above-mentioned main valve 23, pilot circuit 27 and pilot valve 31 of the third flow control valve 13, respectively.

Further, the directional control valve 9 is constructed similarly to the directional control valve 8. Hereinafter, the identical constituent members of the directional control valve 9 to those of the directional control valve 8 are designated at the same numerals of the corresponding constituent members of the directional control valve 8 added with an affix A.

The output ports 32 of the first and second flow control valve 11, 12 in the directional control valve 8 are connected to the aforesaid line 61 through the check valves 80, 81, respectively, and the output ports of first and second flow control valve 11A, 12A in the directional control valve 9 are also connected to a line 61A through check valves 80A, 81A, respectively. The lines 61, 61A are connected to each other through a line 82 which is connected to the tank through a restrictor 83. With this arrangement, during the combined operation using the hydraulic actuators 6, 7, the load pressure of either the hydraulic actuator 6 or 7 on the higher pressure side, i.e., the maximum load pressure, is selected through the check valves 80, 81 and 80A, 81A and introduced to the lines 61, 61A, 82. Thus, the lines 61, 61A, 82 jointly constitute a maximum load pressure circuit.

The pump regulator 10 comprises a swash plate tilting device 90 of hydraulic cylinder type and a control valve 91. The swash plate tilting device 90 has a rod side cylinder chamber to which the delivery pressure of the hydraulic pump 1 is introduced through a line 92, and a head side cylinder chamber to which is connected to the tank and the rod side cylinder chamber through the control valve 91. The delivery pressure of the hydraulic pump introduced the rod side cylinder chamber of the swash plate tilting device is depressurized in response to a position of the control valve 91 and actuates a piston in accordance with the difference in area between the rod and head side cylinder chambers, so that the delivery pressure of the hydraulic pump 1 is controlled in response to a position of the control valve 91.

The control valve 91 has hydraulic control parts 93, 94 opposite to each other, and a spring 95. The hydraulic control part 93 is connected to the delivery line of the hydraulic pump 1 through a pilot line 96, and the control part 94 is connected to the maximum load pressure circuit 82 through a pilot 97, respectively. With such arrangement, the control valve 91 is subject to the delivery pressure of the hydraulic pump 1 and the maximum load pressure plus a setting force of the spring 95 in opposite directions. Thus, the control valve 91 is regulated in response to changes in the maximum load pressure for control of the swash plate tilting device 90, so that the delivery pressure of the hydraulic pump 1 is held at a higher pressure than the maximum load pressure by a pressure value equivalent to the resilient strength of the spring 95.

Operating Principles

The operating principles of the pressure compensating valves 33, 34, 33A, 34A will now be described. In the following, features common to all of the pressure compensating valves 33, 34, 33A, 34A will be described in connection with the pressure compensating valve 33 as representative one. For the pressure compensating valves 33, the pressure balance of the valve body 52 is expressed by the following equation:

$$as\ Ps + ac\ Pc = am\ Pl\ \max + az\ Pz$$

For the main valve 21, the pressure balance of the valve body 35 is expressed by the following equation:

$$AcPc = As\ Ps + Al\ Pl$$

From these two equations, the differential pressure across the pilot valve 29 is given as follows, using the relationship of $Ac = As + Al$:

$$az(Pz - Pc) = \left\{ (ac - az)\frac{As}{Ac} + as \right\}(Ps - Pl\ \max) + \left\{ (ac - az)\frac{As}{Ac} + as - am \right\}(Pl\ \max - Pl) + (ac + as - az - am)Pl$$

Therefore, by substituting;

$$\alpha = \frac{1}{az}\left\{ (ac - az)\frac{As}{Ac} + as \right\}$$

$$\beta = \frac{1}{az}\left\{ (ac - az)\frac{As}{Ac} + as - am \right\}$$

$$\gamma = \frac{1}{az}(ac + as - az - am)$$

the above equation can now be expressed by:

$$Pz - Pc = \alpha(Ps - Pl\ \max) + \beta(Pl\ \max - Pl) + \gamma Pl$$

Since $Pz - Pc = \Delta Pz$, the same equation as the above one (1) is obtained. The equation (1) is now cited again:

$$\Delta Pz = \alpha(Ps - Pl\ \max) + \beta(Pl\ \max - Pl) + \gamma Pl$$

Therefore, the equation (1) will be taken into consideration below. The left side $\Delta Pz$ of the equation (1) represents a differential pressure between the inlet pressure Pz and the outlet pressure Pc of the pilot valve 29. The first term in the right side of the equation (1) relates to a differential pressure between the delivery pressure Ps of the hydraulic pump 1 and the maximum load pressure Pl max, with $\alpha$ being a proportional constant. The second term relates to a differential pressure between the maximum load pressure Pl max and the load pressure of the hydraulic actuator 6, i.e., self-load pressure Pl, with $\beta$ being a proportional constant. The third term is determined by the self-load pressure Pl with $\gamma$ being a proportional constant. Since the pressure balance equation for the valve body 35 of the main valve 21 is given by Ac Pc=As Ps+Al Pl, the load pressure Pl of the hydraulic actuator 6 can be represented using the delivery pressure Ps of the hydraulic pump 1 and the outlet pressure Pc of the pilot valve 29. Accordingly, the equation (1) means that the pressure compensating valves 33 can control the differential pressure ΔPz between the inlet pressure Pz and the outlet pressure Pc of the pilot valve 29 based on the four pressures Ps, Pl max, Pc, Pz; that at this time, the differential pressure ΔPz can be controlled in proportion to such three factors as the differential pressure Ps−Pl max between the delivery pressure Ps of the hydraulic pump 1 and the maximum load pressure Pl max, the differential pressure Pl max−Pl between the maximum load pressure Pl max and the self-load pressure Pl, and the self-load pressure Pl, respectively; and that the degrees of proportion to those three factors Ps−Pl max, Pl max−Pl and Pl can optionally be set by selecting respective values of the proportional constants $\alpha$, $\beta$, $\gamma$.

In this respect, the fact that the pressure compensating valve 33 controls the differential pressure ΔPz across the pilot valve 29, is equivalent to controlling the pilot flow rate passing through the pilot valve 29. As a result, it is further equivalent to controlling the main flow rate passing through the main valve 21 based on the function obtainable with a combination of the aforesaid main valve 21 and pilot valve 29.

Furthermore, the differential pressure Ps−Pl max represented by the first term in the right side of the equation (1) remains constant in this embodiment using the pump regulator 10 of load sensing type, so long as the pump regulator 10 is working effectively. That differential pressure is common to all of the pressure compensating valves.

As per the first term in the right side of the equation (1) therefore, controlling the differential pressure ΔPz across the pilot valve 29 in proportion to the differential pressure Ps−Pl max means that the differential pressure ΔPz is controlled as constant in the operating condition where the pump regulator 10 is working effectively. Assuming the opening degree of the pilot valve 29 to be constant, it also means that the main flow rate passing through the main valve 21 is controlled as constant irrespective of fluctuations in the inlet pressure Ps or the outlet pressure Pl of the main valve. In short, the pressure compensating function is performed.

In the operating condition where the pump regulator 10 is not working effectively, as in the case the delivery pressure of the hydraulic pump 1 is lowered upon the total of consumed flow rates of the hydraulic actuators 6, 7 exceeding the maximum delivery flow rate of the hydraulic pump 1 during the combined operation, the differential pressure ΔPz becomes smaller with reducing the differential pressure Ps−Pl max and, hence, the main flow rate passing through the main valve 21 is also reduced. However, since the differential pressure Ps−Pl max is common to the two pressure compensating valves 33(34), 33A(34A), the flow rates passing through the main valves 21(22), 21A(22A) are reduced in the same proportion. Therefore, the flow rates passing through the main valves 21(22), 21A(22A) are distributed proportionally in response to the operated amounts of respective control levers (i.e., opening degrees of the pilot valves 29(30), 29A(30A), so that the delivery flow rate of the hydraulic pump 1 is reliably supplied to the hydraulic actuator on the higher pressure side as well. In short, the flow distributing function can be attained.

As per the second term in the right side of the equation (1), controlling the differential pressure ΔPz across the pilot valve 29 in proportion to the differential pressure Pt max−Pl means that where the load pressure Pl max of the other hydraulic actuator is larger than the self-load pressure Pl, the differential pressure ΔPz across the pilot valve 29 is changed depending on the maximum load pressure Pl max of the other hydraulic actuator. Assuming the opening degree of the pilot valve 29 to be constant, it also means that the main rate passing through the main valve 21 is changed depending on the maximum load pressure Pl max. While preferred flow control is generally effected by the flow control valves free of any effects from other hydraulic actuators, it may be preferable in hydraulic construction machines such as hydraulic excavators to vary the respective flow rates under the effects from load pressures of other hydraulic actuators depending on the working modes. In such modes, the second term in the right side of the equation (1) represent a harmonizing function with which the respective flow rates can be changed for harmonization with other hydraulic actuators.

Finally, as per the third term in the right side of the equation (1), controlling the differential pressure ΔPz across the pilot valve 29 in proportion to the self-load pressure Pl means that the differential pressure ΔPz across the pilot valve 29 is changed in response to changes in the self-load pressure Pl. Assuming the opening degree of the pilot valve 29 to be constant, it also means that the main flow rate passing through the main valve 21 is changed depending on the self-load pressure Pl. This provides a self-pressure compensating function with which the flow rate can be varied in response to changes in the self-load pressure.

As described above, the first term in the right side of the equation (1) governs the pressure compensating and flow distributing function, the second term governs the harmonizing function in combination with other hydraulic actuators, and the third term governs the self-pressure compensating function. Actuation or non-actuation and the degree of each of those three functions can optionally be set by selecting respective values of the proportional constants $\alpha$, $\beta$, $\gamma$.

Among the above three functions, the pressure compensating and flow distributing function in relation to the first term is an essential function to hydraulic construction machines such as hydraulic excavators, and is preferably held constant at all times irrespective of the types and working modes of hydraulic actuators employed. Therefore, the proportional constant $\alpha$ is set to any desired positive value. Since the differential pressure ΔPz across the pilot valve 29 governs the pilot flow rate corresponding to the opening degree of the pilot valve 29 which is determined by the operated amount of the control lever, the proportional constant $\alpha$ for the differential pressure Pl max−Pl of the first term means a proportional gain of the pilot flow rate with respect to the operated amount of the control lever associated with the pilot valve 29 (opening degree of the pilot valve), i.e., a proportional gain of the main flow rate passing through the main valve 21 with respect to that operated amount. Therefore, the proportional constant $\alpha$ is determined corresponding to such proportional gain.

Assuming that the ratio of the pressure receiving area Al of the valve body 35 of the main valve, which receives the load pressure Pl of the hydraulic actuator 6, to the pressure receiving area Ac of the valve body 35, which receives the control pressure Pc of the back pressure chamber 36, is equal to K, the pressure balance of the valve body 35 is expressed by the following equation:

$$Pc=(1-K)Ps+K\,Pl$$

On the other hand, the delivery pressure Ps of the hydraulic pump 1 and the inlet pressure Pz of the pilot valve 29 are under the relationship of Ps≧Pz and, when the pressure compensating valve 33 is in a completely opened state, the relationship of Ps=Pz is established. Therefore, the differential pressure Pz−Pc (=ΔPz) across the pilot valve 29 is expressed by:

$$Pz-Pc \leqq Ps-Pc=K(Ps-Pl) \quad (2)$$

Thus, the maximum differential pressure obtainable with the pilot valve 29 is K (Ps−Pl). Considering now the maximum load pressure side (Pl max=Pl) during the combined operation of the hydraulic actuators 6, 7, the following is obtained with $\beta=0$, $\gamma=0$ assumed in the foregoing equation (1):

$$Pz-Pc=\alpha(Ps-Pl\ \max) \leqq K(Ps-Pl\ \max) \quad (3)$$

Accordingly, if $\alpha$ is set to a value meeting $\alpha>K$, the pilot valve on the side of maximum load pressure cannot produce a differential pressure larger than K(Ps−Pl max), while the pilot valve on the lower pressure side can produce a differential pressure of $\alpha$(Ps−Pl max)>K(Ps−Pl max). This results in different pilot flow rates because the differential pressures across the pilot valves will not become equal to each other even if both the pilot valves are operated to have the same operated amount. This makes it impossible to proportionally distribute the flow rate in response to the respective operated amounts. In spite of incapability of proportional distribution, however, hydraulic fluid can reliably be supplied to the hydraulic actuator on the higher pressure side as well.

For the reason, in case of obtaining the flow distributing function for the pressure compensating valves 33 to distribute the flow rates in proportion to the respective operated amounts (i.e., opening degrees) of the pilot valves, the proportional constant $\alpha$ should be set to meet $\alpha \leqq K$. In particular, where $\alpha=K$ is set, the maximum flow rate can be produced for the same opening degree of the pilot valves, thereby providing the most efficient valve structure.

Meanwhile, where $\alpha$ is set to meet $\alpha>K$, the differential pressure of $\alpha$(Ps−Pl max)>K(Ps−Pl max) is obtained at the pilot valve on the side of lower load pressure, as mentioned above. But when the combined operation is switched to the sole operation of the hydraulic actuator on the side of lower load pressure, the differential pressure larger than K(Ps−Pl) cannot be obtained at the pilot valve on the side of lower load pressure as well. Thus, the differential pressure across that pilot valve is lowered from $\alpha$(Ps−Pl max) to K(Ps−Pl), and hence the pilot flow rate is reduced correspondingly. As a result, the flow rate supplied to that hydraulic actuator is also reduced to speed-down the associated working member, thereby making it difficult to smoothly perform the desired work. To the contrary, where $\alpha$ is set to meet $\alpha \leqq K$, the differential pressure across the pilot valve on the side of lower load pressure is limited to K(Ps−Pl max) also during the combined operation. Thus, even when the combined operation is switched on the sole operation, no variation occurs in the differential pressure, thereby ensuring the stable work operation. Therefore, $\alpha$ is preferably set to meet $\alpha \leqq K$ from the above viewpoint as well.

As will seen from the above, when distributing the flow rate accurately in proportion to the operated amounts of the control levers associated with a plurality of hydraulic actuators, setting $\alpha$ to meet $\alpha \leqq K$ is an essential requirement.

The harmonizing function relating to the second term has different degrees of necessity depending on the types of working members and the working modes driven and effected by the hydraulic actuators 6, 7 It is preferable for some working members and modes to be totally free from the load pressure of the other hydraulic actuator. Therefore, the proportional constant $\beta$ is set to any desired value inclusive of zero based on harmonization in the combined operation of the relevant hydraulic actuator with the other hydraulic actuator.

The self-pressure compensating function relating to the third term has different degrees of necessity depending on the types of working members driven by the hydraulic actuators 6, 7. It is also preferable for some working members to be totally free from the self-load pressure. Therefore, the proportional constant $\gamma$ is set to an any desired value inclusive of zero depending on the types of working members driven by the relevant hydraulic actuator.

Thus, by setting the constants $\alpha$, $\beta$, $\gamma$ to respective predetermined values, it becomes possible to attain the flow distributing function, or the harmonizing function and/or self-pressure compensating function based on the flow distributing function, and to modify characteristics of the flow control valves depending on the types of working members for use in hydraulic construction machines and the working modes thereof.

As mentioned above, the proportional constants $\alpha$, $\beta$, $\gamma$ are expressed using the pressure receiving areas as, ac, am, az of the first through fourth hydraulic control chambers 53-56 of the pressure compensating valve 33 and the pressure receiving areas Ac, As of the valve body 35 of the main valve 21. Herein, the pressure receiving areas Ac, As of the valve body 35 are determined by specific conditions of the main valve 21. Accordingly, if the proportional constants $\alpha$, $\beta$, $\gamma$ are once determined, the pressure receiving areas as, ac, am, az, Ac, As are so set as to obtain those determined values of the proportional constants $\alpha$, $\beta$, $\gamma$. As special cases, the arrangement of the pressure compensating valve meeting as+ac=am+az allows setting of $\gamma=0$, and the arrangement thereof meeting as=am and ac=az allows setting of $\beta=0$. Also, the arrangement thereof meeting as=ac=am=az allows setting of $\beta=\gamma=0$.

Practical setting examples of the proportional constants $\alpha$, $\beta$, $\gamma$ will be described below in connection with the case the hydraulic drive system of this embodiment is applied to a hydraulic excavator of backhoe type.

Figure 4:
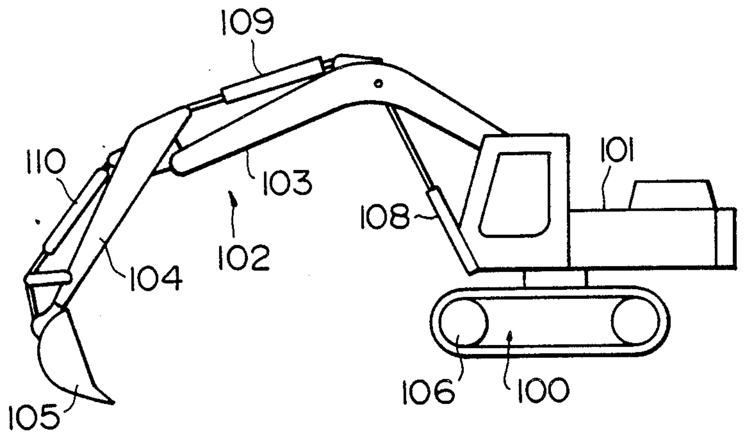
FIG. 4 is a side view of a hydraulic excavator to which the hydraulic drive system of the present invention is to be applied.
Figure 5:
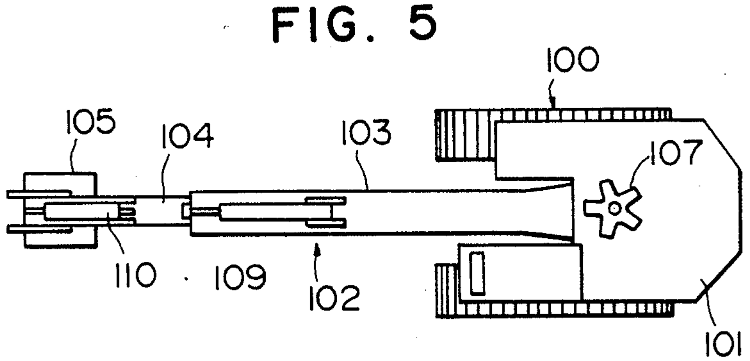
FIG. 5 is a plan view of the hydraulic excavator.

As shown in FIGS. 4 and 5, a hydraulic excavator generally comprises a pair of track bodies 100, a swing body 101 swingably installed on the track bodies 100, and a front attachment 102 mounted onto the swing body 101 rotatably in a vertical plane. The front attachment 102 comprises a boom 103, an arm 104 and a bucket 105. The track bodies 100, swing body 101, boom 103, arm 104 and bucket 105 are driven by a plurality of track motors, swing motor 107, boom cylinder 108, arm cylinder 109 and bucket cylinder 110, respectively. Herein, the swing motor 107, boom cylinder 108, arm cylinder 109 and bucket cylinder 110 correspond each to one or more of the hydraulic actuator 6 or 7 shown in FIG. 1.

Figure 6:
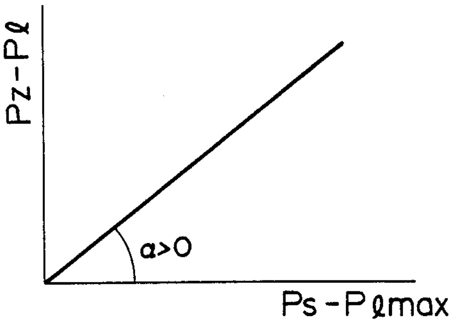
FIG. 6 is a characteristic graph showing a setting example of the constant $\alpha$ for a pressure compensating valve included in each flow control valve of the hydraulic drive system.
Figure 7A:
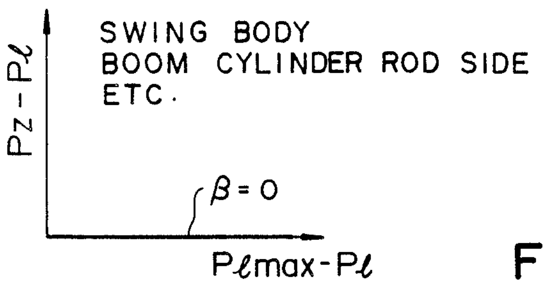
FIGS. 7(A) through 7(D) are characteristic graphs each showing a setting example of the constant $\beta$ for a pressure compensating valve included in one flow control valve of the hydraulic drive system.
Figure 7B:
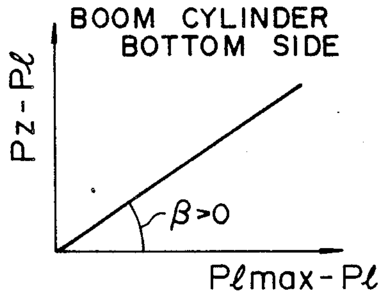
Figure 7C:
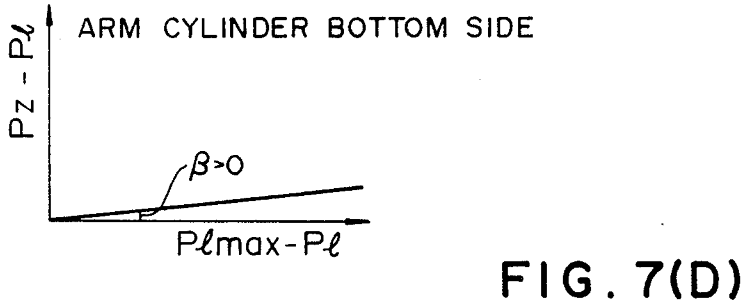
Figure 7D:
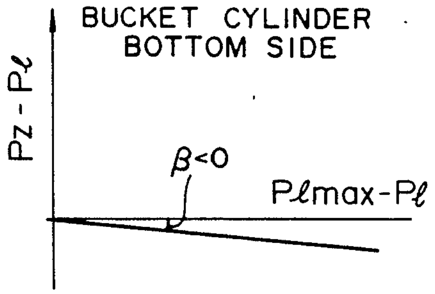
Figure 8A:
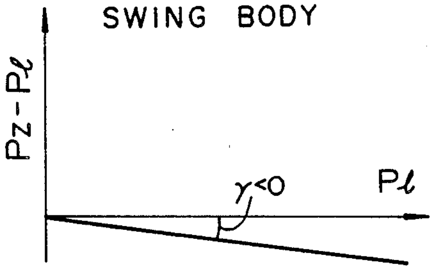
FIGS. 8(A) through 8(C) are characteristic graphs each showing a setting example of the constant $\gamma$ for a pressure compensating valve included in one flow control valve of the hydraulic drive system.
Figure 8B:
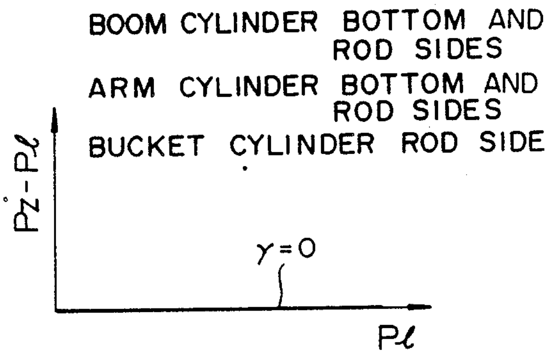
Figure 8C:
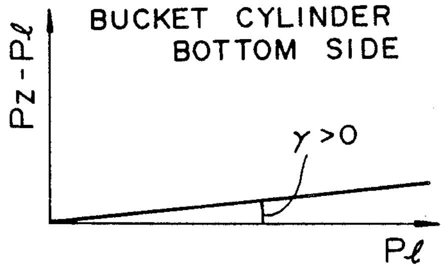

In the hydraulic drive system for such a hydraulic excavator, the proportional constants $\alpha$ commonly affecting to all flow control valves of the swing motor 107, boom cylinder 108, arm cylinder 109 and bucket cylinder 110 are set to the same any desired positive value taking into account the above-mentioned proportional gain, as shown in FIG. 6 by way of example. For a flow control valve associated with the swing motor 107, the proportional constant $\beta$ is set to be $\beta=0$ as shown in FIG. 7(A) and the proportional constant $\gamma$ is set to a small negative value as shown in FIG. 8(A). For a flow control valve associated with the bottom side of the boom cylinder 108, the proportional constant $\beta$ is set to any desired positive value as shown in FIG. 7(B) and the proportional constant $\gamma$ is set to be $\gamma=0$ as shown in FIG. 8(B). For a flow control valve associated with the bottom side of the arm cylinder 109, the proportional constant $\beta$ is set to a small positive value as shown in FIG. 7(C) and the proportional constant $\gamma$ is set to be $\gamma=0$ as shown in FIG. 8(B). For a flow control valve associated with the bottom side of the bucket cylinder 110, the proportional constant $\beta$ is set to a small negative value as shown in FIG. 7(D) and the proportional constant $\gamma$ is set to a small positive value as shown in FIG. 8(C). For a flow control valve associated with the rod side of the boom cylinder 108, a flow control valve associated with the rod side of the arm cylinder 109, and a flow control valve associated with the rod side of the bucket cylinder 110, the proportional constants $\beta$, $\gamma$ are all set to zero as shown in FIGS. 7(A) and 8(B).

Operation of the Embodiment

Operation of the hydraulic drive system thus arranged will be described below.

First, at the time the control levers for the direction control valves 8, 9 are both not being operated, the pilot valves 29, 30, 29A, 30A of the first and second flow control valves 11, 12, 11A, 12A are closed and, hence, no pilot flow rates pass through the pilot circuits 25, 26, 25A, 26A. Therefore, hydraulic fluid will not flow through the respective variable restrictors 44 of the main valves 21, 22, 21A, 22A, so the control pressure Pc of the back pressure chamber 36 is equal to the pressure Pl at the outlet port 32 (i.e., load pressure of the hydraulic actuator 6 or 7). Further, due to the above-mentioned action of the pump regulator 10 of load sensing type, the delivery pressure Ps of the hydraulic pump 1 is held at a pressure level higher than the maximum load pressure Pl max between the hydraulic actuators 6, 7 by an amount of pressure corresponding to a preset value of the spring 95. Thus, since the pressure receiving areas of the valve body 35 have the relationship of $Ac=As+Al$ and are under $Ps>Pl$, the valve body 35 is urged in the valve-closing direction with the delivery pressure Pc of the hydraulic pump 1 so that each main valve 21, 22, 21A, 22A is held in a closed state. Meanwhile, the pressure compensating valves 33, 34, 33A, 34A, are each held in an open state with the pressure receiving areas as, ac, am, az as mentioned above.

Next, when the control lever of the directional control valve 8 is operated solely, the pilot valve 29 of the first flow control valve 11 is opened, for example, in response to the operated amount of the control lever to produce a pilot flow in the pilot circuit 25, so the pilot flow rate passes corresponding to the opening degree of the pilot valve 29. As mentioned above, this causes the valve body 35 of the main valve to be opened to an opening degree proportional to the pilot flow rate under the action of both the variable restrictor 44 and the back pressure chamber 36. As a result, the flow rate corresponding to the operated amount of the control lever (i.e., opening degree of the pilot valve 29) is passed through the inlet port 31 to the outlet port 32, 45 through the main valve 21.

In the resulting state where the pilot valve 29, 31 of the first and third flow control valves 11, 13 are opened by a certain degree and a certain main flow rate is passing through each main valve, if the differential pressure between the inlet port 31 and the outlet port 32 is to be reduced upon an increase in the pressure at the outlet port 32 of the first flow control valve 11, for example, then the pump regulator 10 of load sensing type functions to increase the delivery pressure of the hydraulic pump 1, so that the differential pressure between the pressure at the inlet port 31 (i.e., delivery pressure of the hydraulic pump 1) and the pressure at the outlet port 32 (i.e., load pressure of the hydraulic actuator 6; maximum load pressure) is held constant. Therefore, the certain flow rate corresponding the operated amount of the control lever still continues to pass through the main valve 21.

In such sole operation of the hydraulic actuator 6, where the pressure receiving areas as, ac, am, az of the pressure compensating valve 33 are set such that the proportional constant $\gamma$ in the above equation (1) relating to a self-pressure compensating characteristic takes an arbitrary value other than zero, the differential pressure $\Delta Pz$ across the pilot valve 29 is controlled in response to changes in the load pressure of the hydraulic actuator 6 (i.e., self-load pressure), thereby carrying out compensation of the self-load pressure.

Taking the hydraulic excavator described above with reference to FIGS. 4 through 8 as an example, the proportional constant $\gamma$ for the flow control valve associated with the swing motor 107 is set to a small negative value as shown in FIG. 8(A). More specifically, when driving the swing body 101, the load pressure is increased beyond the limit pressure of a relief valve provided to protect the circuit, since the swing body is of an inertial body. This results in waste of energy. In this respect, however, by setting the proportional constant $\gamma$ to a negative value, the differential pressure $\Delta Pz$ is controlled to be reduced with increasing the load pressure of the swing body, thereby reducing the flow rate passing through the flow control valve. This makes smaller the amount of flow rate dissipated away as a surplus flow rate from the relief valve even if the load pressure is raised up, and hence energy is less wasted.

For the flow control valve associated with the bottom side of the bucket cylinder 110, the proportional constant $\gamma$ is set to a small positive value as shown in FIG. 8(C). Accordingly, as the self-load pressure is raised up during the excavation, the differential pressure $\Delta Pz$ is increased to enlarge the flow rate passing through the flow control valve. Thus, the excavation speed of bucket is increased. This enables excavation with powerful feeling and improves operability.

Next, when both the control levers of the directional control valves 8, 9 are operated concurrently, the operation proceeds as follows. First, in a like manner to the case where the hydraulic actuator is operated solely in both the first and third flow control valves 11, 13 of the directional control valve 8, and the first and third flow control valves 11A, 13A of the directional control valve 9, the pilot flow rates corresponding to their respective operated amounts. Thus, the flow rates corresponding to the operated amounts of the control levers (i.e., opening degrees of the pilot valves 29, 31 and 29A, 31A) are passed through the main valves 21, 23 and 21A, 23A under the action of both the variable restrictors 44, 76 and the back pressure chambers 36, 77. As a result, the hydraulic actuators 6, 7 are driven concurrently.

In the combined operation of the two hydraulic actuators 6, 7, the pressure compensating and flow distributing function is carried out by previously setting the pressure receiving areas as, ac, am, az of each of the pressure compensating valves 33, 33A of the first flow control valves 11, 11A such that the proportional constant $\alpha$ for the first term in the right side of the equation (1) takes any desired positive value as shown in FIG. 6.

Therefore, during the condition where the pump regulator 10 of load sensing type is working effectively in the hydraulic excavator described above with reference to FIGS. 4 through 8 by way of example, it is possible to drive respective working members with certain flow rates corresponding to the operated amounts of their control levers, and carry out the combined operation steadily. Further, even when coming into the condition where the total of consumed flow rates of the hydraulic actuators 6, 7 exceeds the maximum delivery flow rate of the hydraulic pump 1 and the pump regulator 10 can no longer work effectively, hydraulic fluid is reliably supplied to not only the hydraulic actuator on the lower pressure side, but also the hydraulic actuator on the higher pressure side, to thereby ensure that all of the working members can be driven positively. In particular, where $\alpha \leqq K$ is set, there occurs no variation in the flow rates supplied to the respective hydraulic actuators even upon switching from the combined operation to the sole operation. This enables to steadily continue the work.

Setting of $\alpha \leqq K$ also makes it possible to supply the flow rates to the respective hydraulic actuators accurately in proportion to the operated amounts of the corresponding control levers. In particular, where the pressure receiving areas as, ac, am, az of each of the pressure compensating valves 33, 33A are selected such that the proportional constants $\beta$, $\gamma$ in the above equation (1) become zero, the path along which each working member moves can accurately be controlled corresponding to the operated amount of the control lever. By way of example, as shown in FIGS. 7(A) and 8(B), $\beta=0$, $\gamma=0$ are set for the flow control valve associated with the rod side of the boom cylinder 108 and the flow control valve associated with the rod side of the arm cylinder 109. With such setting, during the work of making up the normal surface of a downward slope by the use of the boom and arm, any effects from the load pressures of other hydraulic actuators and the self-load pressure are completely eliminated. Thus, the flow rates supplied in the boom cylinder 108 and the arm cylinder 109 can be distributed accurately in proportion to the respective operated amounts of the boom and arm control levers for accurate making-up of the normal surface.

Moreover, in the above arrangement of the present invention, the pressure compensating valves (auxiliary valves) are installed in not the main circuits but the pilot circuits. Therefore, the fluid leakage is very small even when the hydraulic circuit is highly pressurized, and appreciable pressure loss will not occur if a large flow rate is passed through the main circuit.

Furthermore, where the pressure receiving areas as, ac, am, az of the pressure compensating valves 33, 33A are set such that the proportional constant $\beta$ and/or $\gamma$ in the above equation (1) takes any desired value other than zero, the harmonizing function and/or the self-load pressure compensation are performed on the basis of the above pressure compensating and flow distributing function so as to change the main flow rates passing through the main valve 21 or 21A depending on the maximum load pressure Pl max among other hydraulic actuators and/or the self-load pressure Pl.

In the case of the hydraulic excavator described above with reference in FIGS. 4 through 8, for example, the proportional constant $\beta$ for the flow control valve associated with the swing motor 107 is set to be $\beta=0$ as shown in FIG. 7(A), and the proportional constant $\beta$ for the flow control vale associated with the bottom side of the boom cylinder 108 is set to any desired positive value as shown in FIG. 7(B). Generally, when the swing and boom-up operations are actuated at the same time, the load pressure of the swing motor becomes higher at the initial stage of swing operation since the swing body 101 is of an inertial body. However, when the swing operation reaches the maximum speed, the load pressure is reduced. On the other hand, since the load pressure of the boom cylinder is given by a boom holding pressure, it is lower than the load pressure of the swing motor at the initial stage of swing operation. Also, when the swing and boom-up operations are actuated in digging work effected by an excavator of backhoe type, for example, it is preferable that even if an operator concurrently operates both the swing and boom-up control levers up to their full strokes for simpler manual operation, the boom-up and swing speeds are automatically adjusted such that the boom-up speed is increased faster than the swing speed at the initial stage and, after the boom has been raised up to some extent, the swing speed is increased gradually. By setting the proportional constant $\beta$ as mentioned above, the flow control valve associated with the boom operates in such a manner that during the time the load pressure of the swing motor is high and the differential presure Pl max−Pl is large at the initial stage of swing operation, the differential pressure $\Delta$ Pz across the pilot valve is also large to increase the flow rate supplied to the boom cylinder, and thereafter $\Delta$ Pz is reduced gradually as the differential pressure Pl max−Pl is lowered. As a result, the boom-up and swing speeds can be adjusted automatically and the operator can make the manual operation more easily.

For the flow control valve associated with the bottom side of the arm cylinder 108, the proportional constant $\beta$ is set to a small positive value as shown in FIG. 7(C). When the excavation is carried out by the combined operation using the arm, all of the hydraulic actuators have to work, but at this time, hydraulic fluid tends to flow into the actuator on the lower pressure side in a larger amount. Therefore, hydraulic fluid is restricted at the time passing through the flow control valve, which increases the energy loss. Consequently, fuel economy and heat balance of the hydraulic fluid will both deteriorate. By setting the proportional constant $\beta$ within a range where the balance of combined operation will not be impaired, as mentioned above, the opening degree of the main valve for the flow control valve associated with the arm is increased in response to rise-up of the differential pressure Pl max−Pl, and hence the restriction degree of hydraulic fluid becomes smaller. This enables less degradation of both fuel economy and heat balance.

Further, for the flow control valve associated with the bottom side of the bucket cylinder 110, the proportional constant $\beta$ is set to a small negative value as shown in FIG. 7(D). When a groove is dug by the combined operation of the boom and the bucket with the boom cylinder subject to the maximum pressure for restricting movement of the bucket, for example, the load applied to the bucket is reduced abruptly at the moment it comes up to the ground surface, which will produce a shock. By setting the proportional constant $\beta$ to a small negative value as mentioned above, the increasing differential pressure Pl max−Pl acts on the differential pressure ⊕Pz as a negative factor to proportionally reduce the latter, so that the pilot flow rate is reduced to speed down the bucket. This mitigates the shock which would be otherwise caused at the moment of abrupt reduction in the load, and also improves both safety in operations and feeling during the work.

As per the self-pressure compensation, it is performed for each of actuators used in the combined operation substantially in the same manner as the case described in connection with the sole operation of one hydraulic actuator.

As seen from the above, the hydraulic drive system of this embodiment can provide the flow distributing function, or the harmonizing function and/or the self-pressure compensating function based on the flow distributing function, and can modify the characteristics of the flow control valves depending on the types of working members for use in hydraulic construction machines and the working modes thereof, by properly selecting the respective pressure receiving areas of each of the pressure compensating valves so that the proportional constants $\alpha$, $\beta$, $\gamma$ are set to their predetermined values.

Furthermore, in the hydraulic drive system of this embodiment, each pressure compensating valve serving as an auxiliary valve is disposed in not the main circuit but the pilot circuit. Therefore, fluid leakage is very small, which makes the hydraulic circuit more suitable for higher pressurization. In addition, appreciable pressure loss will not occur at the auxiliary valve even if a large flow rate is passed through the main circuit. This is also economical.

The foregoing embodiment has been described, with reference to FIGS. 6 through 8, as setting the constants $\beta$, $\gamma$ in the equation (1) to the predetermined values other than zero for the particular ones among flow control valves associated with the swing body, boom, arm and bucket of the hydraulic excavator. However, the present invention is not limited to such embodiment, and the constants $\beta$, $\gamma$ may be set to zero for all the flow control valves. Even in this case, by setting the constant $\alpha$ in the equation (1) to a positive value, particularly such a value as meeting $\alpha \leqq K$, the above-mentioned pressure compensating and flow distribution function can be attained in the circuit arrangement which is less subject to fluid leakage and pressure loss.

Other Embodiments

Another embodiment of the present invention will be described below with reference to FIGS. 9 and 10. Note that identical members in these figures to those in the embodiment shown in FIG. 1 are designated at the same reference numerals.

In the foregoing embodiment, the delivery pressure Ps of the hydraulic pump, the maximum load pressure Pl max, and the inlet and outlet pressures Pz, Pc of the pilot valves are directly employed for controlling each pressure compensating valve. However, these four pressures are related to each other via the control pressure of the back pressure chamber of the main valve, so it is also possible to control the pressure compensating valve and provide the above-mentioned characteristics to the pressure compensating valve without direct use of all the four pressures. FIGS. 9 and 10 shows another embodiment in which the four pressures are not directly employed for controlling the pressure compensating valve from the above standpoint.

Figure 9:
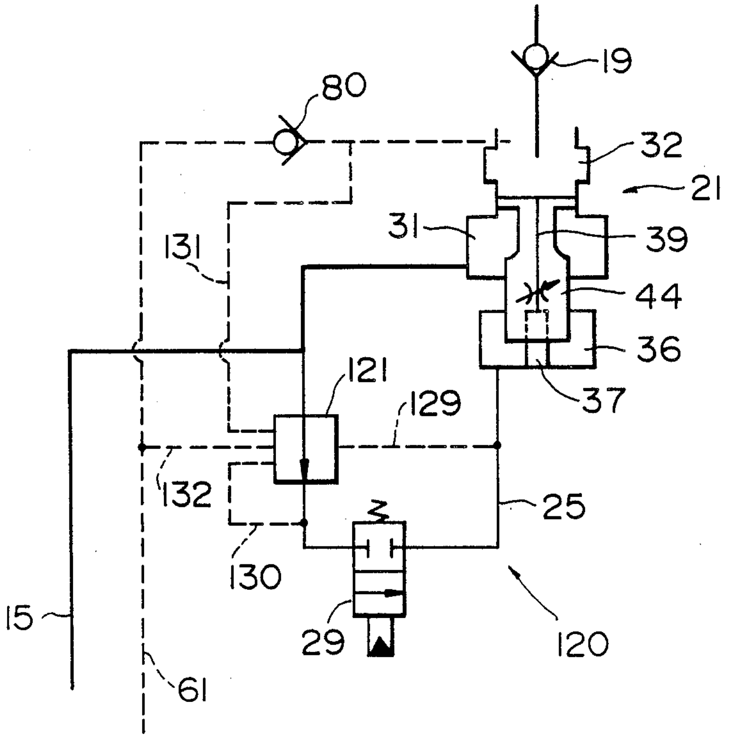
FIG. 9 is a schematic view of a flow control valve connected to a metered flow-in circuit in a hydraulic drive system according to another embodiment of the present invention.
Figure 10:
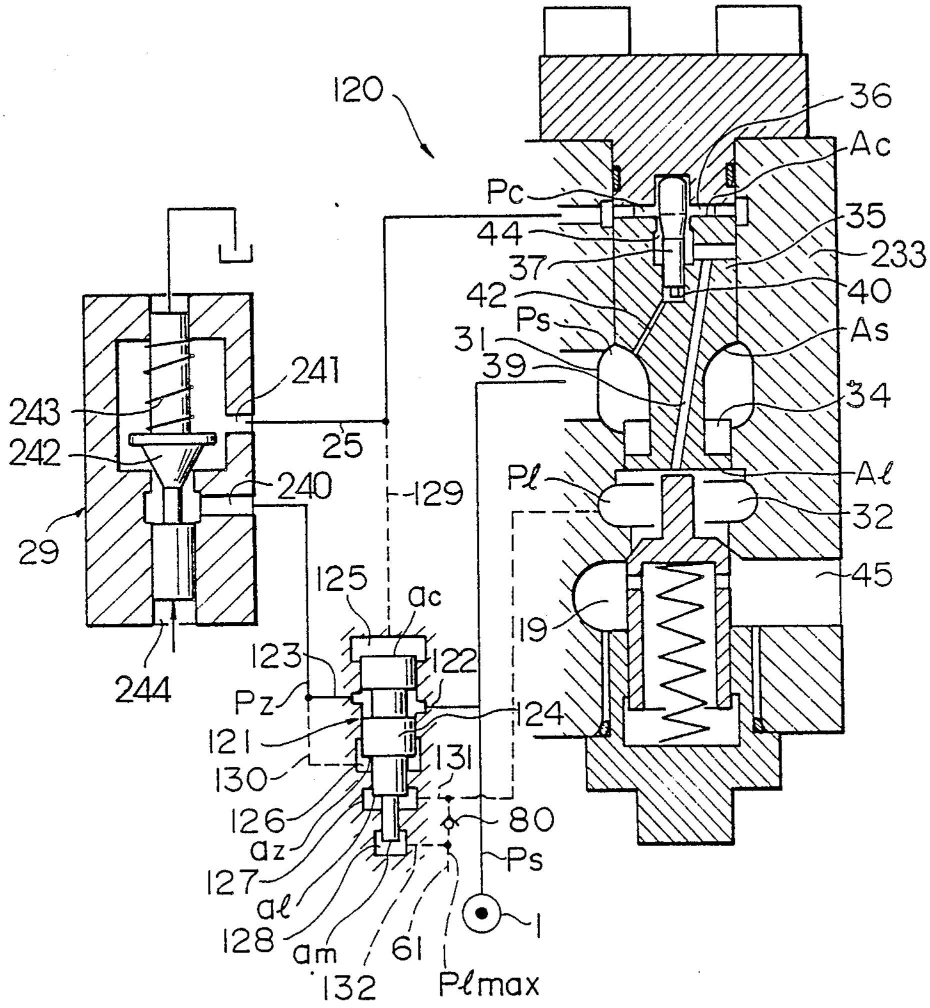
FIG. 10 is a sectional view showing the structure of the flow control valve of FIG. 9.

More specifically, in FIGS. 9 and 10, a pressure compensating valve 121 disposed in a pilot circuit 25 of a flow control valve 120 comprises a valve body 124 of spool type for controlling communication between an inlet port 122 and an outlet port 123, a first hydraulic chamber 125 for urging the valve body 124 in the valve-opening direction, and second, third and fourth hydraulic chambers 126, 127, 128 positioned in opposite relation to the first hydraulic control chamber 125 for urging the valve body 124 in the valve-closing direction. The first hydraulic control chamber 125 is connected to the outlet side of a pilot valve 29 in the pilot circuit 25 through a pilot line 129, the second hydraulic control chamber 126 is connected to the inlet side of the pilot valve 29 in the pilot circuit 25 through a pilot line 130, the third hydraulic control chamber 127 is connected to an outlet port 32 of a main valve 21 through a pilot line 131, and the fourth hydraulic chamber 128 is connected to a maximum load pressure line 61 through a pilot line 132, respectively. With such arrangement, the outlet pressure Pc of the pilot valve 29 (i.e., control pressure of a back pressure chamber 36 of the main valve) is introduced to the first hydraulic control chamber 125, the inlet pressure Pz of the pilot valve 29 is introduced to the second hydraulic control chamber 126, the load pressure Pl of either hydraulic actuator 6 or 7 is introduced to the third hydraulic control chamber 127, and the maximum load pressure Pl max between the hydraulic actuators 6, 7 is introduced to the fourth hydraulic chamber 128, respectively.

Then, the end surface of the valve body 124 facing the first hydraulic control chamber 125 defines a pressure receiving area ac which receives the outlet pressure Pc of the pilot valve 29, the annular end surface of the valve body 124 facing the second hydraulic control chamber 126 defines a pressure receiving area az which receives the inlet pressure Pz of the pilot valve 29, the annular end surface of the valve body 124 facing the third hydraulic control chamber 127 defines a pressure receiving area al which receives the load pressure Pl of the hydraulic actuator 6 or 7, and the end surface of the valve body 124 facing the fourth hydraulic control chamber 128 defines a pressure receiving area am which receives the maximum load pressure Pl max, respectively. Similarly to the above first embodiment, these pressure receiving areas ac, az, al, am are so set as to obtain desired respective values of proportional constants α, β, γ mentioned below.

The pressure balance of the valve body 124 in the pressure compensating valve 121 is expressed by the following equations:

$$ac\ Pc = az\ Pz + al\ Pl + am\ Pl\ max$$

Also, the pressure balance of the valve body 35 in the main valve 21 is expressed by the following equation:

$$Ac\ Pc = As.Ps + al.Pl$$

From the above two equations, the differential pressure across the pilot valve 29 is given below using the relationship of Ac=As+Al:

$$az(Pz - Pc) = (ac - az)\frac{As}{Ac}(Ps - Pl\ \mathrm{max}) + \left\{(ac - az)\frac{As}{Ac} - am\right\}(Pl\ \mathrm{max} - Pl) + (ac - az - am - al)Pl$$

Therefore, by substituting:

$$\alpha = \frac{1}{az}(ac - az)\frac{As}{Ac}$$

$$\beta = \frac{1}{az}\left\{(ac - az)\frac{As}{Ac} - am\right\}$$

$$\gamma = \frac{1}{az}(ac - az - am - al)$$

the above equation is now expressed by:

$$Pz - Pc = \alpha.(Ps - Pl\ \mathrm{max}) + \beta.(Pl\ \mathrm{max} - Pl) + \gamma Pl \quad (4)$$

Assuming the differential pressure across the pilot valve 29 to be ΔPz, the left side is replaced by ΔPz since Pz=Pc=ΔPz. Thus, there can be obtained the same equation as that (1) derived in the embodiment shown in FIG. 1.

Also in this embodiment, therefore, by setting the proportional constants α, β, γ to their predetermined values, the differential pressure ΔPz across the pilot valve 29 can be controlled in proportion to three factors; the differential pressure Ps−Pl max between the delivery pressure Ps of the hydraulic pump 1 and the maximum load pressure Pl max, the differential pressure Pl max−Pl between the maximum load pressure sure Pl max and the self-load pressure Pl, and the self-load pressure Pl, respectively, thereby enabling to attain the pressure compensating and flow distributing function (first term in the right side), or the harmonizing function (second term in the right side) during the combined operation and/or the self-pressure compensating function (third term in the right side) based on the pressure compensating and flow distributing function, as mentioned above. In other words, this embodiment introduces the inlet pressure Pz of the pilot valve 29, the outlet pressure Pc thereof, the self-load pressure Pl and the maximum load pressure Pl max rather than directly using the inlet pressure Pz, the outlet pressures Pc, the delivery pressure Ps of the hydraulic pump 1 and the maximum load pressure Pl max, in order to provide the same effect as attained using the latter four pressures Pz, Pc, Ps, Pl max.

Figure 11:
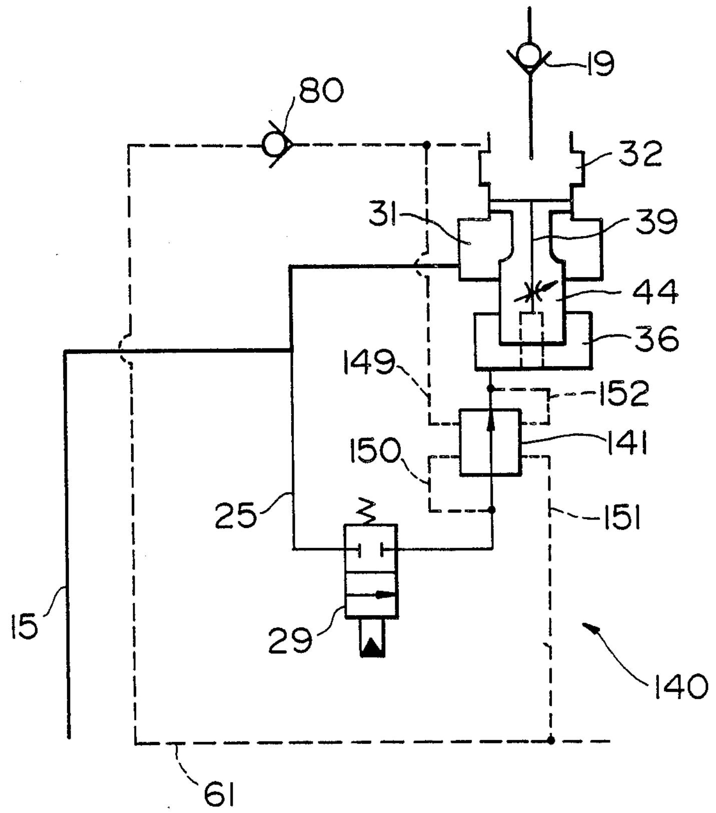
FIG. 11 is a schematic view of a flow control valve connected to a metered flow-in circuit in a hydraulic drive system according to still another embodiment of the present invention.
Figure 12:
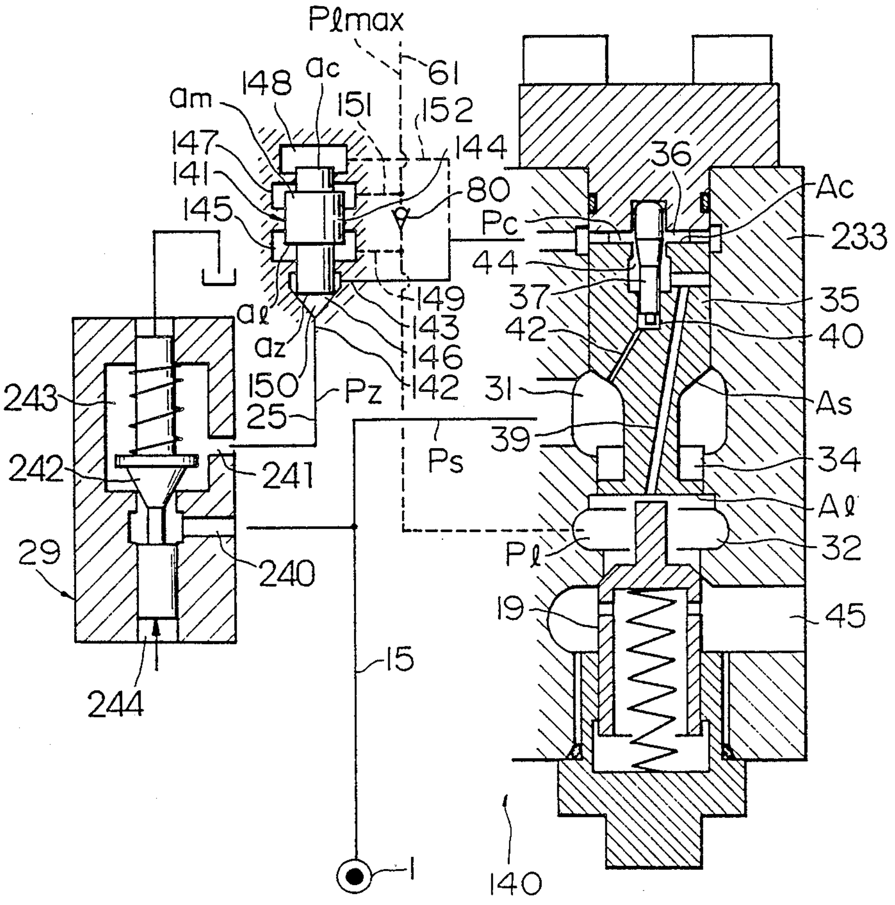
FIG. 12 is a sectional view showing the structure of the flow control valve of FIG. 11.

Still another embodiment of the present invention will be described with reference to FIGS. 11 and 12. In the foregoing embodiments, the pressure compensating valve was disposed in the pilot circuit on the inlet side of the pilot valve 29. Alternatively, the pressure compensating valve may be disposed in the pilot circuit on the outlet side of the pilot valve. FIGS. 11 and 12 show such a modified embodiment.

More specifically, in FIGS. 11 and 12, a flow control valve 140 includes a pressure compensating valve 141 connected to the pilot valve 25 between the pilot valve 29 and the back pressure chamber 36 of the main valve 21. The pressure compensating valve 141 comprises a valve body 144 of seat valve type for controlling communication between an inlet port 142 and an outlet port 143, first and second hydraulic chambers 145, 146 for urging the valve body 144 in the valve-opening direction, and third and fourth hydraulic chambers 147, 148 for urging the valve body 144 in the valve-closing direction. The first hydraulic control chamber 145 is connected to the outlet port 32 of the main valve 21 through a pilot line 149, the second hydraulic control chamber 146 is formed within an inlet portion communicating with the inlet port 142 of the pressure compensating valve 141, the third hydraulic control chamber 147 is connected to the maximum load pressure line 61 through a pilot line 151, and the fourth hydraulic chamber 148 is connected to the back pressure chamber 36 of the main valve 21 through a pilot line 152, respectively. With such arrangement, the load pressure Pl of either hydraulic actuator 6 or 7 is introduced to the first hydraulic control chamber 145, the outlet pressure Pz of the pilot valve 29 is introduced to the second hydraulic control chamber 146, the maximum load pressure Pl max is introduced to the third hydraulic control chamber 147, and the control pressure Pc of a back pressure chamber 36 of the main valve) is introduced to the fourth hydraulic chamber 148, respectively.

Then, the annular end surface of the valve body 144 facing the first hydraulic control chamber 145 defines a pressure receiving area al which receives the load pressure Pl of the hydraulic actuator 6 or 7, the end surface of the valve body 144 facing the second hydraulic control chamber 145 defines a pressure receiving area az which receives the outlet pressure Pz of the pilot valve 29, the annular end surface of the valve body 144 facing the third hydraulic control chamber 147 defines a pressure receiving area am which receives the maximum load pressure Pl max, and the end surface of the valve body 144 facing the fourth hydraulic control chamber 148 defines a pressure receiving area ac which receives the control pressure Pc of the back pressure chamber 36, respectively. Similarly to the above embodiments, those pressure receiving area al, az, am ac are so set as to obtain desired respective values of proportional constant α, β, γ mentioned below.

The pressure balance of the valve body 144 in the pressure compensating valve 141 is expressed by the following equation:

$$acPc + am\ Pl\ \mathrm{max} = alPl + azPz$$

Also, the pressure balance of the valve body 35 in the main valve 21 is expressed by the following equation:

$$AcPc = AsPs + alPl$$

From the above two equations, the differential pressure across the pilot valve 29 is given below using the relationship of Ac=As+Al:

$$az(Ps - Pz) = \left(az - ac\frac{As}{Ac}\right)(Ps - Pl\max) + \left(az - ac\frac{As}{Ac} - am\right)(Pl\max - Pl) + (az - al - ac - am)Pl$$

Therefore, by substituting;

$$\alpha = \frac{1}{az}(az - ac)\frac{As}{Ac}$$

$$\beta = \frac{1}{az}\left(az - ac\frac{As}{Ac} - am\right)$$

$$\gamma = \frac{1}{az}(az + al - ac - am)$$

the above equation is now expressed by:

$$Pz - Pc = \alpha(Ps - Pl\,max) + \beta(Pl\max - Pl) + \gamma Pl \qquad (5)$$

Assuming the differential pressure across the pilot valve 29 to be ΔPz, the left side is replaced by ΔPz since Ps−Pz=ΔPz. Thus, there can be obtained the same equation as that (1) derived in the embodiment shown in FIG. 1.

Also in this embodiment, therefore, by setting the proportional constants α,β,γ to their predetermined values, the differential pressure ΔPz across the pilot valve 29 can be controlled in proportion to three factors; the differential pressure Ps−Pl max between the delivery pressure Ps of the hydraulic pump 1 and the maximum load pressure Pl max, the differential pressure Pl max−Pl between the maximum load pressure Pl max and the self-load pressure Pl, and the self-load pressure Pl, respectively, thereby enabling to attain the pressure compensating and flow distributing function (first term in the right side), or the harmonizing function (second term in the right side) during the combined operation and/or the self-pressure compensating function (third term in the right side) based on the pressure compensating and flow distributing function, as mentioned above. Stated differently, in this embodiment where the pressure compensating valve 141 is disposed at the outlet side of the pilot valve 29, there can also be attained the similar effect as in the case it is disposed at the inlet side of the pilot valve 29.

Figure 13:
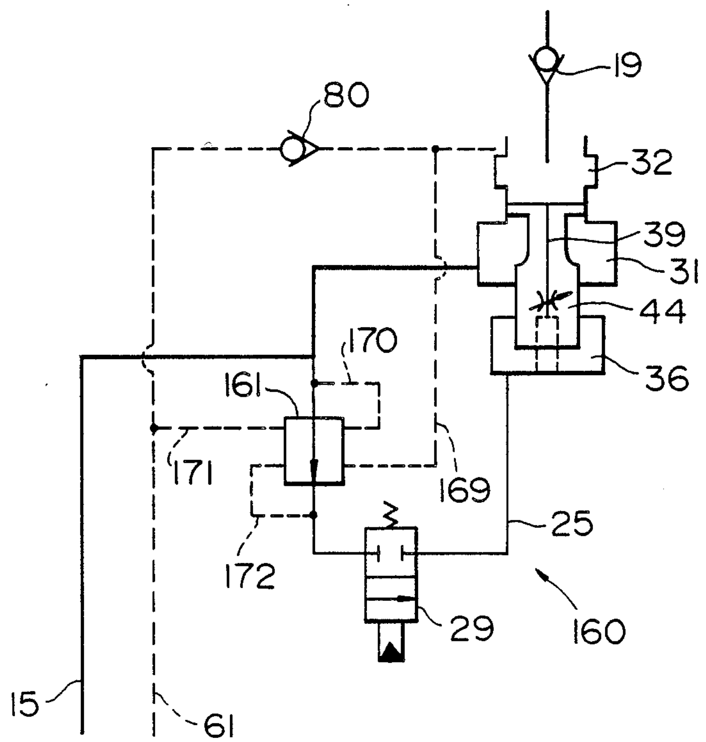
FIG. 13 is a schematic view of a flow control valve connected to a metered flow-in circuit in a hydraulic drive system according to a further embodiment of the present invention.
Figure 14:
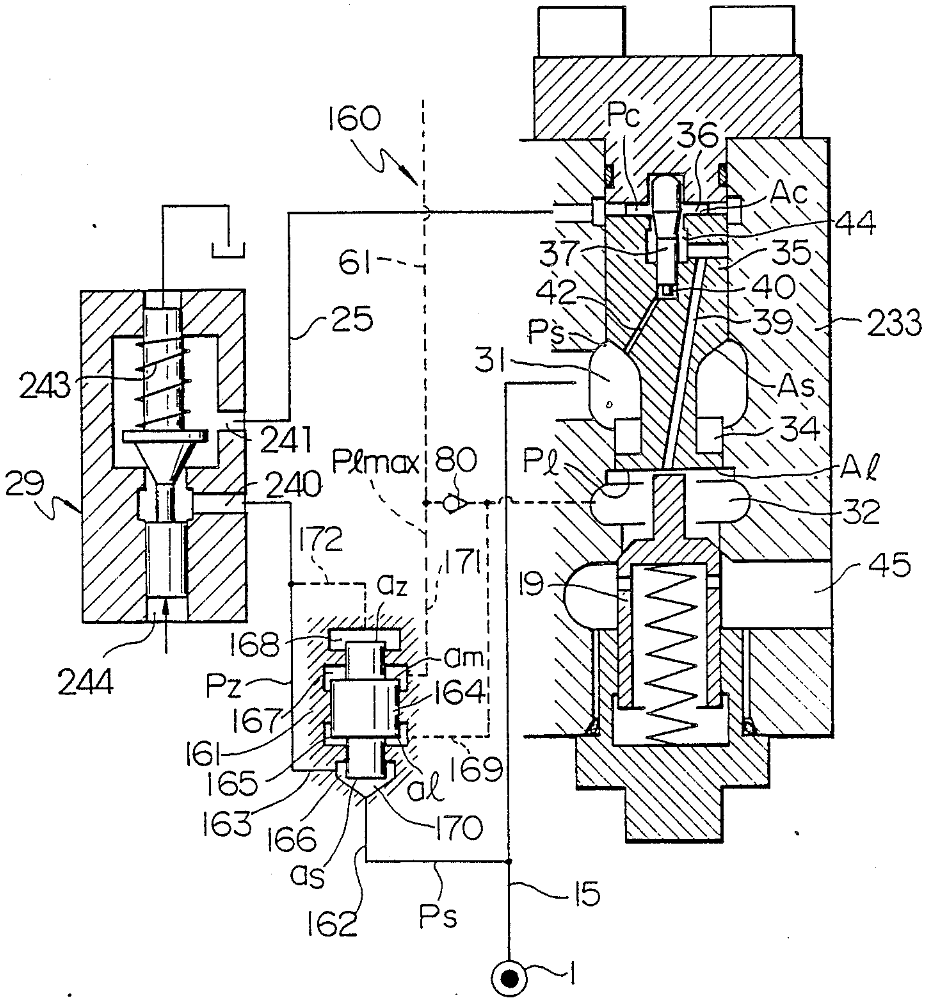
FIG. 14 is a sectional view showing the structure of the flow control valve of FIG. 13.

FIGS. 13 and 14 show another embodiment in which the pressure compensating valve is disposed at the outlet side of the pilot valve, but it is controlled without direct use of the inlet and outlet pressures of the pilot valve, the delivery pressure of the hydraulic pump, and the maximum load pressure.

More specifically, in FIGS. 13 and 14, a pressure compensating valve 161 disposed in the pilot circuit 25 of a flow control valve 160 comprises a valve body 164 of seat valve type for controlling communication between an inlet port 162 and an outlet port 163, first and second hydraulic chamber 165, 166 for urging the valve body 164 in the valve-opening direction, and third and fourth hydraulic chambers 167, 168 positioned in opposite relation to the first and second hydraulic control chamber 165, 166 for urging the valve body 164 in the valve-closing direction. The first hydraulic control chamber 165 is connected to the outlet port 32 of the main valve 21 through a pilot line 169, the second hydraulic control chamber 166 is formed in an inlet portion communicating with the inlet port of the pressure compensating valve 161, the third hydraulic control chamber 167 is connected to the maximum load pressure line 61 through a pilot line 171, and the fourth hydraulic chamber 168 is connected to the pilot circuit 25 on the inlet side of the pilot valve 29 through a pilot line 172, respectively. With such arrangement, the load pressure Pl of either hydraulic actuator 6 or 7 is introduced to the first hydraulic control chamber 165, the delivery pressure Ps of the hydraulic pump 1 is introduced to the second hydraulic control chamber 166, the maximum load pressure Pl max between the hydraulic actuators 6, 7 is introduced to the third hydraulic control chamber 167, and the inlet pressure Pz of the pilot valve 29 is introduced to the fourth hydraulic chamber 168, respectively.

Then, the annular end surface of the valve body 164 facing the first hydraulic control chamber 165 defines a pressure receiving area al which receives the load pressure Pl of the hydraulic actuator 6 or 7, the end surface of the valve body 164 facing the second hydraulic control chamber defines a pressure receiving area as which receives the delivery pressure Ps of the hydraulic pump 1, the annular end surface of the valve body 164 facing the third hydraulic control chamber 167 defines a pressure receiving area am which receives the maximum load pressure Pl max, and the end surface of the valve body 164 facing the fourth hydraulic control chamber 168 defines a pressure receiving area az which receives the inlet pressure Pz of the pilot valve 29, respectively. Similarly to the above embodiments, those pressure receiving area al, as, am, az are so set as to obtain desired respective values of proportional constants α, β,γ mentioned below.

The pressure balance of the valve body 164 in the pressure compensating valve 161 is expressed by the following equation:

$$azPz + amPl\max = alPl + asPs$$

Also, the pressure balance of the valve body 35 in the main valve 21 is expressed by the following equation:

$$AcPc = AsPs + alPl$$

From the above two equations, the differential pressure across the pilot valve 29 is given below using the relationship of Ac=As+Al:

$$az(Pz - Pc) = \left(as - az\frac{As}{Ac}\right)(Ps - Pl\max) + \left(as - az\frac{As}{Ac} - \mathrm{am}\right)(Pl\max - Pl) + (as + al - am - az)Pl$$

Therefore, by substituting;

$$\alpha = \frac{1}{az}\left(as - az\frac{As}{Ac}\right)$$

$$\beta = \frac{1}{az}\left(as - az\frac{As}{Ac} - am\right)$$

$$\gamma = \frac{1}{az}(as + al - am - az)$$

the above equation is now expressed by:

$$Pz - Pc = \alpha(Ps - Pl\ \max) + \beta(Pl\ \max - Pl) + \gamma Pl \quad (6)$$

Assuming the differential pressure across the pilot valve 29 to be ΔPz, the left side is replaced by ΔPz since Ps−Pz=ΔPz. Thus, there can be obtained the same equation as that (1) derived in the embodiment shown in FIG. 1.

Also in this embodiment, therefore, by setting the proportional constants $\alpha,\beta,\gamma$ to their predetermined values, the differential pressure ΔPz across the pilot valve 29 can be controlled in proportion to three factors; the differential pressure Ps−Pl max between the delivery pressure Ps of the hydraulic pump 1 and the maximum load pressure Pl max, the differential pressure Pl max−Pl between the maximum load pressure Pl max and the self-load pressure Pl, and the self-load pressure Pl, respectively, thereby enabling to attain the pressure compensating and flow distributing function (first term in the right side), or the harmonizing function (second term in the right side) during the combined operation and/or the self-pressure compensating function (third term in the right side) based on the pressure compensating and flow distributing function, as mentioned above.

Figure 15:
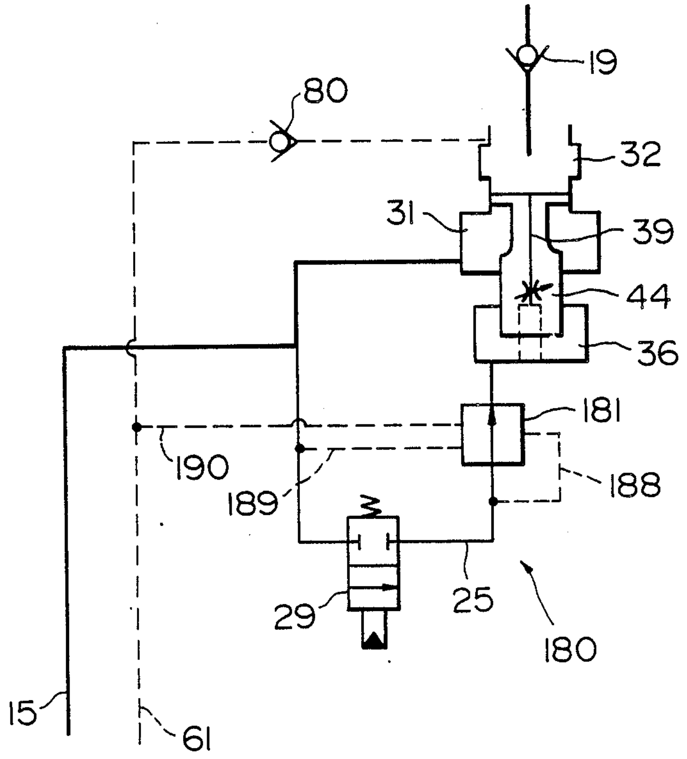
FIG. 15 is a schematic view of a flow control valve connected to a metered flow-in circuit in a hydraulic drive system according to a still further embodiment of the present invention.
Figure 16:
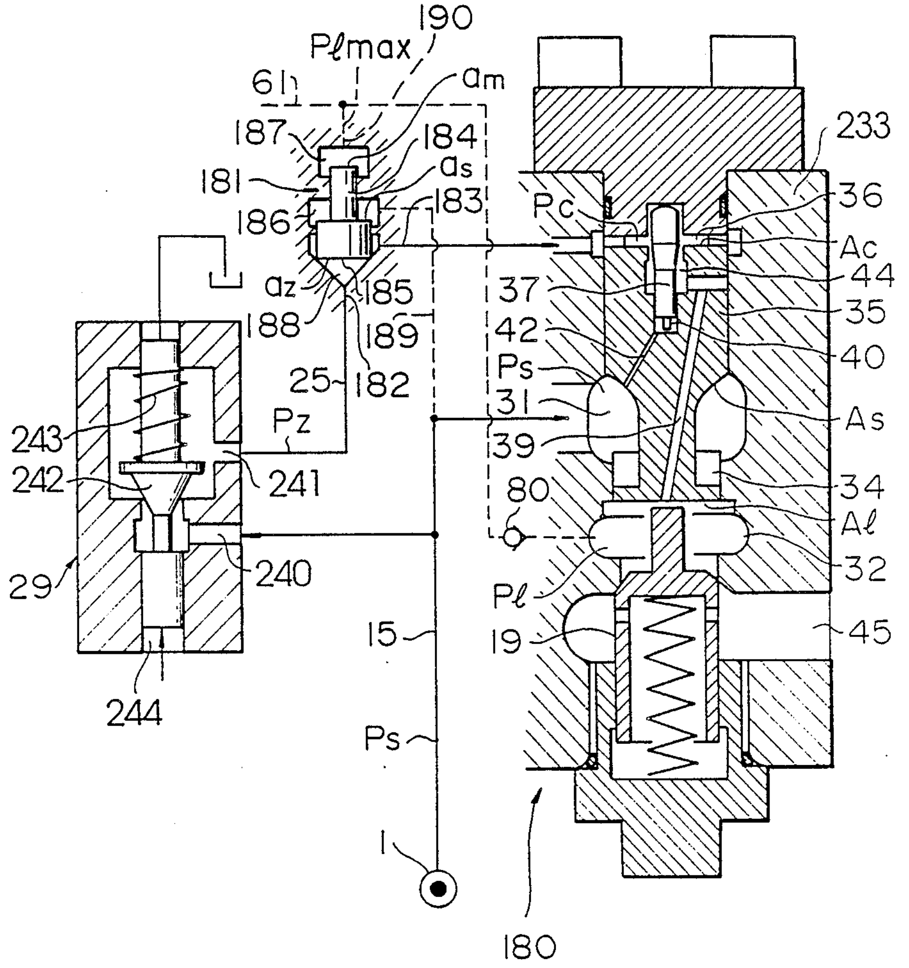
FIG. 16 is a sectional view showing the structure of the flow control valve of FIG. 15.

Still another embodiment of the present invention will be described with reference to FIGS. 15 and 16. In all of the foregoing embodiments, four pressures were employed for controlling the pressure compensating valve. However, since those four pressures, i.e., the delivery pressure of the hydraulic pump, the maximum load pressure, and the inlet and outlet pressures of the pilot valve, are correlated to each other via the control pressure in the back pressure chamber of the main valve, the pressure compensating valve can be controlled without using four pressures, thereby giving the above-mentioned characteristics to the pressure compensating valve. FIGS. 15 and 16 show another of this type of embodiment.

More specifically, in FIGS. 15 and 16, a flow control valve 180 includes a pressure compensating valve 181 disposed in the pilot circuit 25 between the pilot valve 29 and the back pressure chamber 36 of the main valve. The pressure compensating valve 181 comprises a valve body 184 of seat valve type for controlling communication between an inlet port 182 and an outlet port 183, a first hydraulic chamber 185 for urging the valve body 184 in the valve-opening direction, and second and third hydraulic chambers 186, 187 positioned in opposite relation to the first hydraulic control chamber 185 for urging the valve body 184 in the valve-closing direction. The first hydraulic chamber 185 is formed within an inlet portion 188 communicating with the inlet port 182 of the pressure compensating valve 181, the second hydraulic control chamber 186 is connected to the pilot circuit 25 on the inlet side of the pilot valve 29 or the metered flow-in circuit 15 on the inlet side of the main valve 21 through a pilot line 189, and the third hydraulic control chamber 187 is connected to the maximum load pressure line 61 through a pilot line 190, respectively. With such arrangement, the outlet pressure Pz of the pilot valve 29 is introduced to the first hydraulic control chamber 185, the delivery pressure Ps of the hydraulic pump 1 is introduced to the second hydraulic control chamber 186, and the maximum load pressure Pl max is introduced to the third hydraulic control chamber 187, respectively.

Then, the end surface of the valve body 184 facing the first hydraulic control chamber 185 defines a pressure receiving area az which receives the outlet pressure Pz of the pilot valve 29, the annular end surface of the valve body 184 facing the second hydraulic control chamber 186 defines a pressure receiving area as which receives the delivery pressure Ps of the hydraulic pump 1, and the end surface of the valve body 184 facing the third hydraulic control chamber 187 defines a pressure receiving area am which receives the maximum load pressure Pl max, respectively. Similarly to the above embodiments, those pressure receiving area az, as, am are so set as to obtain desired respective values of proportional constants $\alpha$, $\beta$, $\gamma$ mentioned below.

The pressure balance of the valve body 184 in the pressure compensating valve 181 is expressed by the following equation:

$$azPz = asPs + amPl\ \max$$

Also, the pressure balance of the valve body 35 in the main valve 21 is expressed by the following equation:

$$AcPc = AsPs + alPl$$

From the above two equations, the differential pressure across the pilot valve 29 is given below using the relationship of Ac=As+Al:

$$az(Ps - Pz) = (az - as)(Ps - Pl\ \max) + (az - as - am)(Pl\ \max - Pl) + (az - as - am)Pl$$

Therefore, by substituting;

$$\alpha = \frac{1}{az}(az - as)$$

$$\beta = \frac{1}{az}(az - as - am)$$

$$\gamma = \frac{1}{az}(az - as - am)$$

the above equation is now expressed by:

$$Pz - Pc = \alpha(Ps - Pl\ \max) + \beta(Pl\ \max - Pl) + \gamma Pl \quad (7)$$

Assuming the differential pressure across the pilot valve 29 to be ΔPz, the left side is replaced by ΔPz since Ps−Pz=ΔPz. Thus, there can be obtained the same equation as that (1) derived in the embodiment shown in FIG. 1. It is to be noted that $\beta,\gamma$ cannot be determined independently because they have the same value in this embodiment.

Also in this embodiment, therefore, by setting the proportional constants $\alpha,\beta,\gamma$ to their predetermined values, the differential pressure ΔPz across the pilot valve 29 can be controlled in proportion to three factors; the differential pressure Ps−Pl max between the delivery pressure Ps of the hydraulic pump 1 and the maximum load pressure Pl max, the differential pressure Pl max − Pl between the maximum load pressure Pl max and the self-load pressure Pl, and the self-load pressure Pl, respectively, thereby enabling to attain the pressure compensating and flow distributing function (first term in the right side), or the harmonizing function (second term in the right side) during the combined operation and/or the self-pressure compensating function (third term in the right side) based on the pressure compensating and flow distributing function, as mentioned above.

As described above, the present invention is intended to control the pressure compensating valve based on four pressures; i.e., the inlet and outlet pressures of the pilot valve, the delivery pressure of the hydraulic pump 1 and the maximum load pressure, thereby selectively achieving the pressure compensating and flow distributing function, or the harmonizing function and/or self-pressure compensating function based on the pressure compensating and flow distributing function. Those four pressures are correlated to each other via the control pressure in the back pressure chamber of the main valve, so the pressure compensating valve can also be controlled without direct use of all the four pressures, and in either case the pressure compensating valve is disposed at the inlet or outlet side of the pilot valve. It is further possible to control the pressure compensating valve using other than four pressures.

Figure 17:
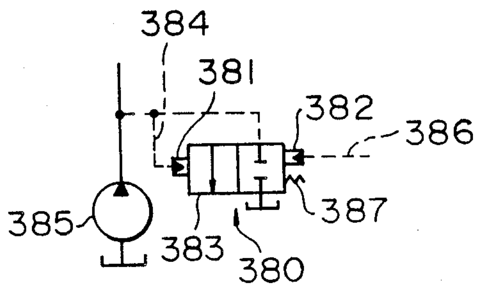
FIG. 17 is a circuit diagram showing an embodiment of a pump regulator of load sensing type where a fixed displacement pump is used in the hydraulic drive system of the present invention.

Next, another embodiment of the present invention relating to the pump control means will be described below. In the foregoing embodiments, the hydraulic drive system was described in combination with the pump regulator of load sensing type, and the pump regulator of load sensing type was described as an implement to control the delivery pressure of the variable displacement hydraulic pump. But the hydraulic pump may be of a fixed displacement type. In this case, the pump regulator of load sensing type is constructed as shown in FIG. 17. More specifically, in FIG. 17, a pump regulator 380 is associated with a relief valve 383 having pilot chambers 381, 382 positioned opposite to each other. The delivery pressure of a fixed displacement hydraulic pump 385 is introduced to the pilot chamber 381 through a pilot line 384 and the maximum load pressure is introduced to the pilot chamber 382 through a pilot line 386, with a spring 387 disposed on the same side as the pilot chamber 382. This arrangement enables to hold the delivery pressure of the hydraulic pump 385 higher than the maximum load pressure among a plurality of hydraulic actuators by a pressure valve corresponding to the resilient strength of the spring 387.

Figure 18:
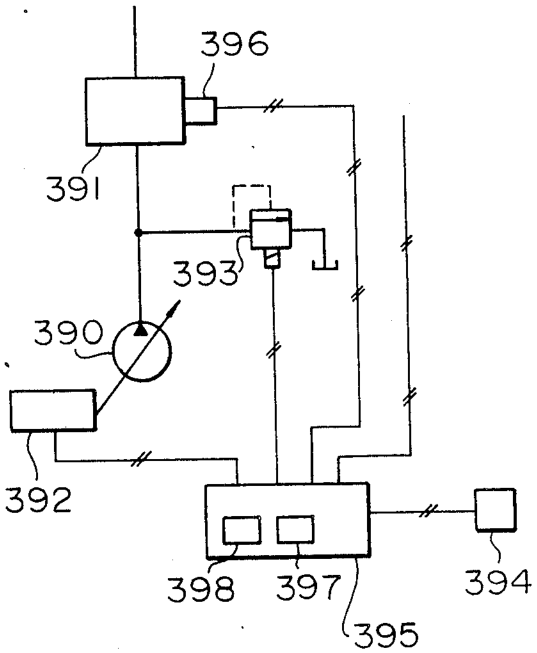
FIG. 18 is a circuit diagram showing an embodiment of pump control means of not load sensing type which is used in the hydraulic drive system of the present invention.

Further, the hydraulic drive system of the present invention may be made up in combination with a pump regulator other than load sensing type. FIG. 18 shows such a modification. More specifically, in FIG. 18, a hydraulic pump 390 is connected to a flow control valve 391 consisting of a main valve, a pilot valve and a pressure compensating valve which are combined as mentioned above, and produces a delivery flow rate adjusted by a pump flow control device 392. An unloading valve 393 is connected between the hydraulic pump 390 and the flow control valve 391, and the flow control valve 391 is associated with an operation device 394. An operated signal from the operation device 394 is sent to a control device 395 which applies a control signal to a pilot valve driver part 396 of the flow control valve 391 for controlling the opening degree of the pilot valve. The operated signal sent to the control device 395 is also applied to a processing device 397 which calculates a required flow rate of the flow control valve 391 from the map previously stored in a storage device 398, and then sends a calculated signal to the pump flow control device 392. At the same time, the processing device 397 calculates a setting pressure of the unloading valve 393 from another map previously stored in the storage device 398, and then sends a calculated signal to the unloading valve 393. This allows the delivery pressure of the hydraulic pump 390 to be controlled equal to a pressure obtained from the map previously stored in the storage device 398 as a function of the operated signal.

In the hydraulic drive system of the present invention combined with such pump control means, the differential pressure Ps − Pl max represented by the first term in the right side of the foregoing equation (1) cannot be controlled to be constant. Therefore, the pressure compensating function obtainable with the first term in the right side cannot be achieved. In the combined operation, however, that differential pressure remains common to all of the flow control valves associated with the respective hydraulic actuators, so the flow distributing function can still be achieved. Further, since the second and third terms in the right side of the equation (1) are not related to the pump delivery pressure Ps, the coordinating function and/or the pressure self-compensating function on the basis of the flow distributing function can be achieved in case of setting $\beta,\gamma$ to any values other than zero.

Although the embodiments of the present invention have been described with reference to the drawings, the present invention is not limited to the particular embodiments mentioned above, and can be subject to various other modifications and changes without departing from the spirit and scope of the invention.

For example, although the foregoing embodiments were illustrated as driving two hydraulic actuators by a hydraulic pump, it is a matter of course that the present invention is also applicable to the case of using three or more hydraulic actuators. Also, the pump control means may be associated with a simple relief valve for holding the delivery pressure of the hydraulic pump at constant.

What is claimed is:

1. A hydraulic drive system comprising: at least one hydraulic pump; at least first and second hydraulic actuators connected to said hydraulic pump through respective main circuits and driven by hydraulic fluid delivered from said hydraulic pump; first and second flow control valve means connected to said respective main circuits between said hydraulic pump and said first and second hydraulic actuators; pump control means for controlling a delivery pressure of said hydraulic pump; each of said first and second flow control valve means comprising first valve means having an opening degree variable in response to the operated amount of operation means, and second valve means connected in series with said first valve means for controlling a differential pressure between the inlet pressure and the output pressure of said first valve means; and control means associated with each of said first and second flow control valve means for controlling said second valve means based on the input pressure and the output pressure of said first valve means, the delivery pressure of said hydraulic pump, and the maximum load pressure between said first and second hydraulic actuators, wherein:

each of said first and second flow control valve means comprises: a main valve having a valve body for controlling communication between an inlet port and an outlet port both connected to said main circuit, a variable restrictor capable of changing an opening degree thereof in response to displacements of said valve body, and a back pressure chamber communicating with said outlet port through said variable restrictor and producing a control pressure to urge said valve body in the valve-opening direction; and a pilot circuit connected between the inlet port and said back pressure chamber of said main valve;

said first valve means is a pilot valve connected to said pilot circuit for controlling a pilot flow passing through said pilot circuit, and said second valve means is an auxiliary valve connected to said pilot circuit for controlling a differential pressure between the inlet pressure and the outlet pressure of said pilot valve; and said control means controls said auxiliary valve for each of said first and second flow control valve means such that the differential pressure between the inlet pressure and the outlet pressure of said pilot valve has a relationship as expressed by the following equation with respect to a differential pressure between the delivery pressure of said hydraulic pump and the maximum load pressure of said first and second hydraulic actuators, a differential pressure between said maximum load pressure and the self-load pressure of each of said hydraulic actuators, and the self-load pressure, $$\Delta Pz = \alpha(Ps - Pl\ \max) + \beta(Pl\ \max - Pl) + \gamma Pl$$

where $\Delta Pz$: differential pressure between the inlet pressure and the outlet pressure of the pilot valve Ps: delivery pressure of the hydraulic pump Pl max: maximum load pressure between the first and second hydraulic actuators Pl: self-load pressures of each of the first and second hydraulic actuators $\alpha$, $\beta$, $\gamma$: first, second and third constants said first, second and third constants $\alpha$, $\beta$, $\gamma$ being set to respective predetermined values.

2. A hydraulic drive system according to claim 1, wherein said first constant $\alpha$ meets a relationship of $\alpha \leqq K$, assuming that K is a ratio of the pressure receiving area of the valve body of said main valve undergoing the load pressure of the associated hydraulic actuator through said outlet port to the pressure receiving area of the valve body of said main valve undergoing the control pressure of said back pressure chamber.

3. A hydraulic drive system according to claim 2, wherein said second and third constants $\beta$, $\gamma$ are each set to zero.

4. A hydraulic drive system according to claim 1, wherein said first constant $\alpha$ is set to any desired positive value corresponding to the proportional gain of a main flow rate passing through said main valve with respect to the operated amount of said operation means.

5. A hydraulic drive system according to claim 1, wherein said second constant $\beta$ is set to any desired value based on harmonization in the combined operation of the associated hydraulic actuator and one or more other hydraulic actuators.

6. A hydraulic drive system according to claim 1, wherein said third constant $\gamma$ is set to any desired value based on operating characteristics of the associated hydraulic actuator.

7. A hydraulic drive system according to claim 1, wherein said control means has a plurality of hydraulic control chambers provided in each of said auxiliary valves for said first and second flow control valve means, and line means for directly or indirectly introducing the delivery pressure of said hydraulic pump, said maximum load pressure, and the inlet pressure and the outlet pressure of said pilot valve to said plurality of hydraulic control chambers, the respective pressure receiving areas of said plurality of hydraulic control chambers being set such that said first, second and third constants $\alpha$, $\beta$, $\gamma$ take their predetermined values.

8. A hydraulic drive system according to claim 7, wherein said auxiliary valve is disposed between the inlet port of said main valve and said pilot valve, said plurality of hydraulic control chambers comprise first and second hydraulic control chambers for urging said auxiliary valve in the valve-opening direction, and third and fourth hydraulic control chambers for urging said auxiliary valve in the valve-closing direction, and said line means comprises a first line for introducing the delivery pressure of said hydraulic pump to said first hydraulic chamber, a second line for introducing the outlet pressure of said pilot valve to said second hydraulic control chamber, a third line for introducing said maximum load pressure to said third hydraulic control chamber, and a fourth line for introducing the inlet pressure of said pilot valve to said fourth hydraulic control chamber.

9. A hydraulic drive system according to claim 7, wherein said auxiliary valve is disposed between the back pressure chamber of said main valve and said pilot valve, said plurality of hydraulic control chambers comprise a first hydraulic control chamber for urging said auxiliary valve in the valve-opening direction, and second, third and fourth hydraulic control chambers for urging said auxiliary valve in the valve-closing direction, and said line means comprises a first line for introducing the outlet pressure of said pilot valve to said first hydraulic chamber, a second line for introducing the inlet pressure of said pilot valve to said second hydraulic control chamber, a third line for introducing the load pressure of the associated hydraulic actuator to said third hydraulic control chamber, and a fourth line for introducing said maximum load pressure to said fourth hydraulic control chamber.

10. A hydraulic drive system according to claim 7, wherein said auxiliary valve is disposed between the back pressure chamber of said main valve and said pilot valve, said plurality of hydraulic control chambers comprise first and second hydraulic control chambers for urging said auxiliary valve in the valve-opening direction, and third and fourth hydraulic control chambers for urging said auxiliary valve in the valve-closing direction, and said line means comprises a first line for introducing the load pressure of the associated hydraulic actuator to said first hydraulic chamber, a second line for introducing the outlet pressure of said pilot valve to said second hydraulic control chamber, a third line for introducing said maximum load pressure to said third hydraulic control chamber, and a fourth line for introducing the control pressure of said back pressure chamber to said fourth hydraulic control chamber.

11. A hydraulic drive system according to claim 7, wherein said auxiliary valve is disposed between the inlet port of said main valve and said pilot valve, said plurality of hydraulic control chambers comprise first and second hydraulic control chambers for urging said auxiliary valve in the valve-opening direction, and third and fourth hydraulic control chambers for urging said auxiliary valve in the valve-closing direction, and said line means comprises a first line for introducing the load pressure of the associated hydraulic actuator to said first hydraulic chamber, a second line for introducing the delivery pressure of said hydraulic pump to said second hydraulic control chamber, a third line for introducing said maximum load pressure to said third hydraulic control chamber, and a fourth line for introducing the inlet pressure of said pilot valve to said fourth hydraulic control chamber.

12. A hydraulic drive system according to claim 7, wherein said auxiliary valve is disposed between the back pressure chamber of said main valve and said pilot valve, said plurality of hydraulic control chambers comprise a first hydraulic control chamber for urging said auxiliary valve in the valve-opening direction, and second and third hydraulic control chambers for urging said auxiliary valve in the valve-closing direction, and said line means comprises a first line for introducing the outlet pressure of said pilot valve to said first hydraulic chamber, a second line for introducing the delivery pressure of said hydraulic pump to said second hydraulic control chamber, and a third line for introducing said maximum load pressure to said third hydraulic control chamber.

13. A hydraulic drive system according to claim 1, wherein said pump control means comprises a pump regulator of load sensing type for holding the delivery pressure of said hydraulic pump higher a predetermined value than the maximum load pressure between said first and second hydraulic chambers.

14. A hydraulic excavator comprising: at least one hydraulic pump; a plurality of hydraulic actuators connected to said hydraulic pump through respective main circuits and driven by hydraulic fluid delivered from said hydraulic pump; a plurality of working members including a swing body, boom, arm and bucket, and driven by said plurality of hydraulic actuators, respectively; a plurality of flow control valve means connected to said respective main circuits between said hydraulic pump and said plurality of hydraulic actuators; pump control means for controlling a delivery pressure of said hydraulic pump; each of said plurality of flow control valve means comprising first valve means having an opening degree variable in response to the operated amount of operation means, and second valve means connected in series with said first valve means for controlling a differential pressure between the inlet pressure and the output pressure of said first valve means; and control means associated with each of said plurality of flow control valve means for controlling said second valve means based on the input pressure and the output pressure of said first valve means, the delivery pressure of said hydraulic pump, and the maximum load pressure among said plurality of hydraulic actuators, wherein:

each of said plurality of flow control valve means comprises: a main valve having a valve body for controlling communication between an inlet port and an outlet port both connected to said main circuit, a variable restrictor capable of changing an opening degree thereof in response to displacements of said valve body, and a back pressure chamber communicating with said outlet port through said variable restrictor and producing a control pressure to urge said valve body in the valve-opening direction; and a pilot circuit connected between the inlet port and said back pressure chamber of said main valve;

said first valve means is a pilot valve connected to said pilot circuit for controlling a pilot flow passing through said pilot circuit, and said second valve means is an auxiliary valve connected to said pilot circuit for controlling a differential pressure between the inlet pressure and the outlet pressure of said pilot valve; and said control means controls said auxiliary valve means for each of said plurality of flow control valve means associated with at least two working members among said swing body, boom, arm and bucket such that the differential pressure between the inlet pressure and the outlet pressure of said pilot valve has a relationship as expressed by the following equation with respect to a differential pressure between the delivery pressure of said hydraulic pump and the maximum load pressure among said plurality of hydraulic actuators, a differential pressure between said maximum load pressure and the self-load pressure of each of said hydraulic actuators, and the self-load pressure, $$\Delta Pz = \alpha(Ps - Pl\ \mathrm{max}) + \beta(Pl\ \mathrm{max} - Pl) + \gamma Pl$$

where

ΔPz: differential pressure between the inlet pressure and the outlet pressure of the pilot valve Ps: delivery pressure of the hydraulic pump Pl max: maximum load pressure among the plurality of hydraulic actuators Pl: self-load pressure of each of the plurality of hydraulic actuators α, β, γ: first, second and third constants said first, second and third constants α, β, γ being set to respective predetermined values.

15. A hydraulic drive system according to claim 14, wherein said first constant α meets a relationship of $\alpha \leqq K$, assuming that K is a ratio of the pressure receiving area of the valve body of said main valve undergoing the load pressure of the associated hydraulic actuator through said outlet port to the pressure receiving area of the valve body of said main valve undergoing the control pressure of said back pressure chamber.

16. A hydraulic excavator according to claim 14 or 15, wherein said control means sets said second and third constants β, γ to zero for the flow control valve means associated with the rod side of said hydraulic actuator for each of said boom and arm.

17. A hydraulic excavator according to claim 15, wherein said control means sets said second and third constants to zero for the flow control valve means associated with the rod side of said hydraulic actuator for each of said boom and arm.

18. A hydraulic excavator according to claim 14, wherein said control means sets said second constant β to a relatively large positive value for the flow control valve means associated with the bottom side of said hydraulic actuator for said boom.

19. A hydraulic excavator according to claim 14, wherein said control means sets said second constant β to a relatively small positive value for the flow control valve means associated with the bottom side of said hydraulic actuator for said arm.

20. A hydraulic excavator according to claim 14, wherein said control means sets said second constant $\beta$ to a relatively small negative value for the flow control valve means associated with the bottom side of said hydraulic actuator for said bucket.

21. A hydraulic excavator according to claim 14, wherein said control means sets said third constant $\gamma$ to a relatively small negative value for the flow control valve means associated with the hydraulic actuator for said swing body.

22. A hydraulic excavator according to claim 14, wherein said control means sets said third constant $\gamma$ to a relatively small positive value for the flow control valve means associated with the hydraulic actuator for said bucket.

* * * * *